(12) United States Patent
Jha et al.

(10) Patent No.: US 12,443,612 B2
(45) Date of Patent: Oct. 14, 2025

(54) SYSTEM AND METHODS FOR PERSONALIZATION AND CUSTOMIZATION OF SEARCH RESULTS AND SEARCH RESULT RANKING IN AN INTERNET-BASED SEARCH ENGINE

(71) Applicant: Retail Capital LLC, Southfield, MI (US)

(72) Inventors: Sourabh Jha, Bengaluru (IN); Zhen Zhao, Farmington Hills, MI (US); Jack Mansueti, San Francisco, CA (US); Satyajit Samal, Bengaluru (IN); Danny M. Yelle, South Windsor, CT (US); Jerome M. Pender, Northville, MI (US)

(73) Assignee: Retail Capital LLC, Southfield, MI (US)

( * ) Notice: Subject to any disclaimer, the term of this patent is extended or adjusted under 35 U.S.C. 154(b) by 0 days.

(21) Appl. No.: 18/826,949

(22) Filed: Sep. 6, 2024

(65) Prior Publication Data
US 2025/0103602 A1   Mar. 27, 2025

Related U.S. Application Data

(60) Provisional application No. 63/568,360, filed on Mar. 21, 2024, provisional application No. 63/539,906, filed on Sep. 22, 2023.

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC ...................... G06F 16/24578; G06F 16/9535
See application file for complete search history.

(56) References Cited

U.S. PATENT DOCUMENTS

2021/0049443 A1 * 2/2021 Klaiman .................. G06N 3/04

OTHER PUBLICATIONS

Ali et al., "Metasearching using Supervised Rank Aggregation." Proc. of the 2011 IEEE International Conference on Computational Intelligence and Computing Research (2011 IEEE ICCIC), Kanyakumari, India, IEEE press. 2011. (Year: 2011).*

* cited by examiner

*Primary Examiner* — Jay A Morrison
(74) *Attorney, Agent, or Firm* — Nancy R. Gamburd; Gamburd Law Group LLC

(57) ABSTRACT

A computer server system and method are disclosed for personalization and customization of search results and search result rankings, such as for Internet searching. A representative server system comprises: a network interface to receive a primary query and transmit secondary queries and search results; and one or more processors configured to generate the secondary queries; to extract or transform responses into text variables; to use trained, supervised multi-class neural networks to classify the text variables to form initial classifications or categories and combine the initial classifications or categories to form resulting classifications or categories; to filter and rank the resulting classifications or categories; and to use the filtered and ranked resulting classifications or categories to generate and output the personalized search results and search result rankings, the personalized search results and search result rankings comprising one or more associated classifications or categories corresponding to the primary query.

23 Claims, 14 Drawing Sheets

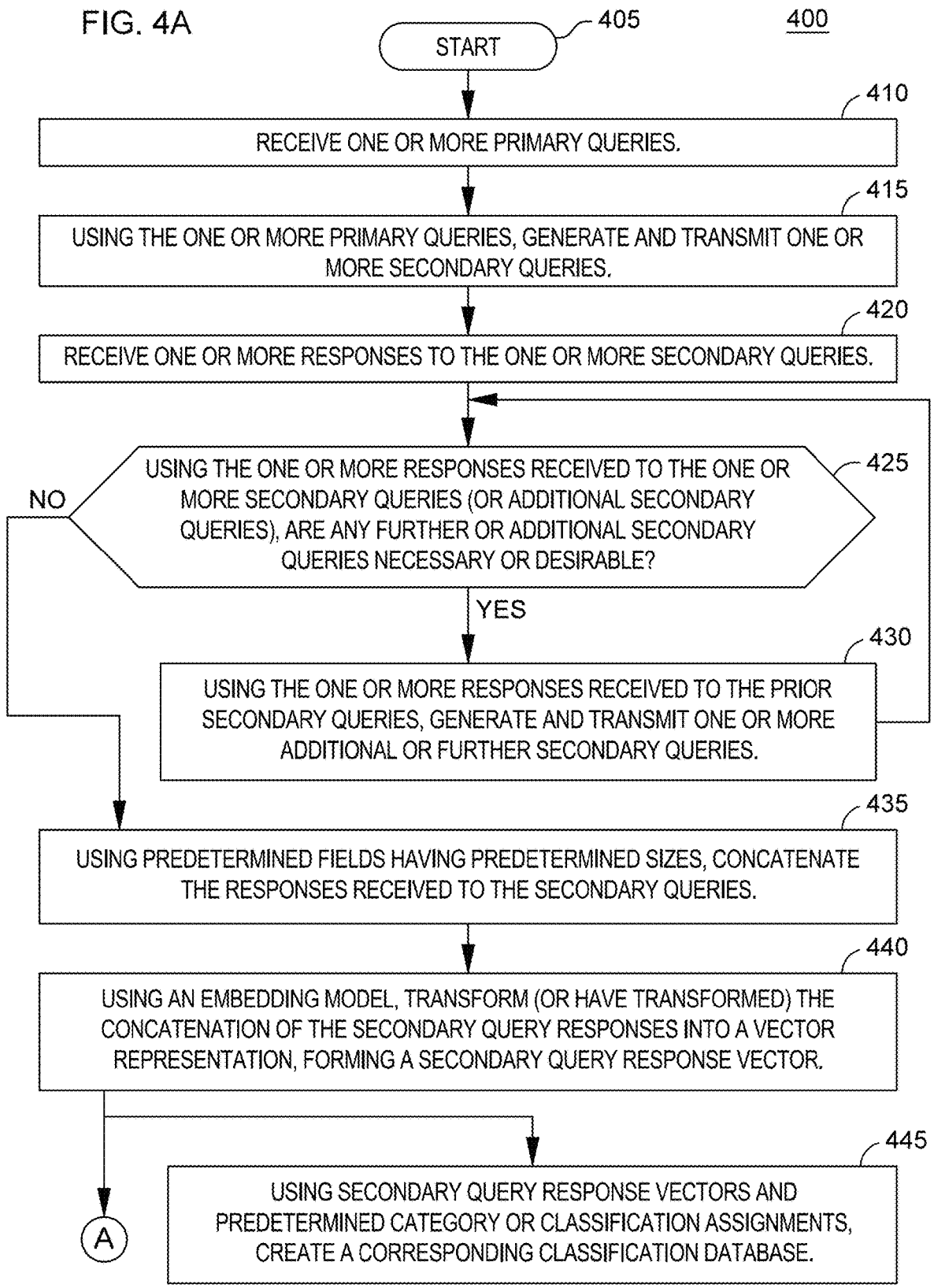

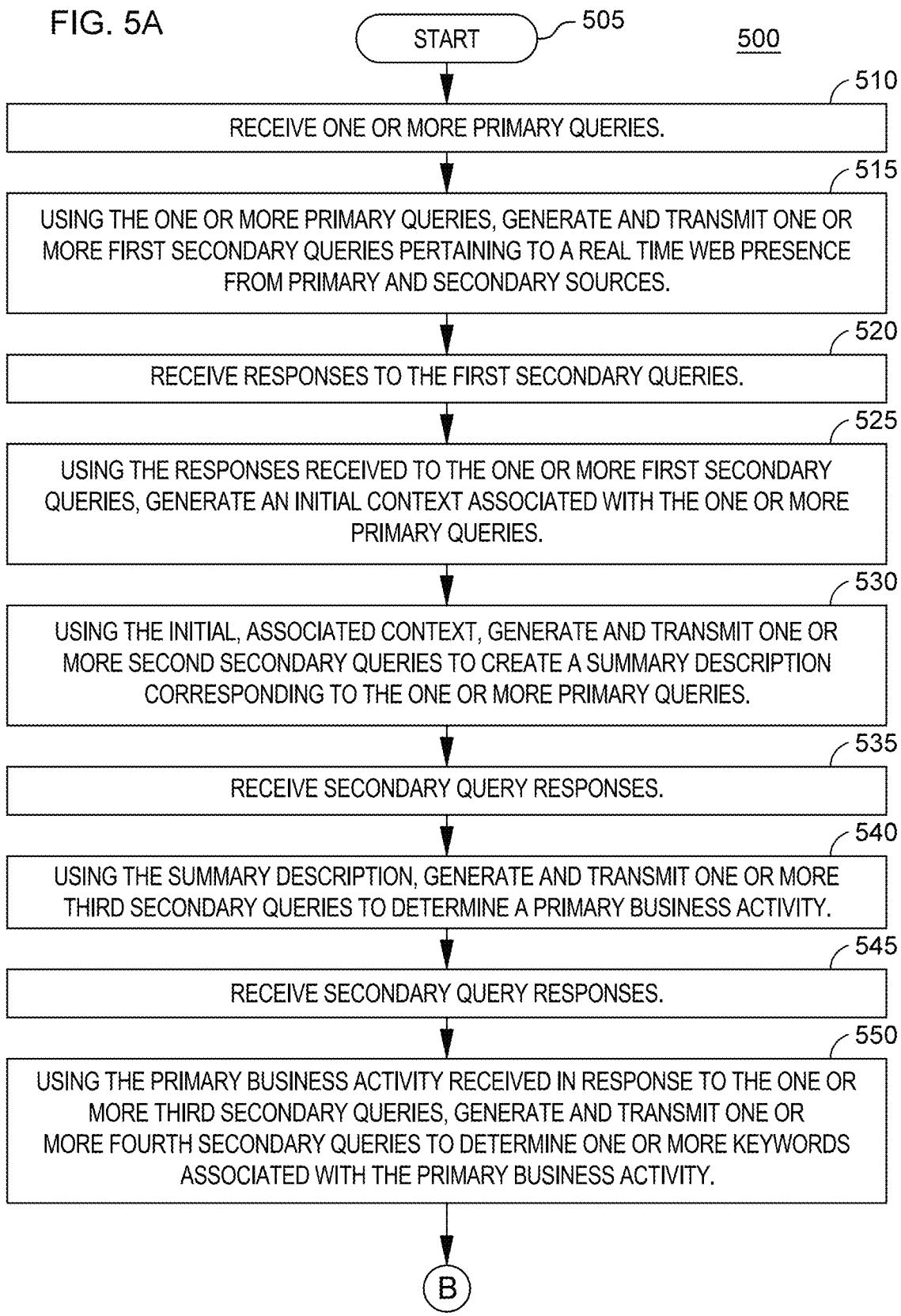

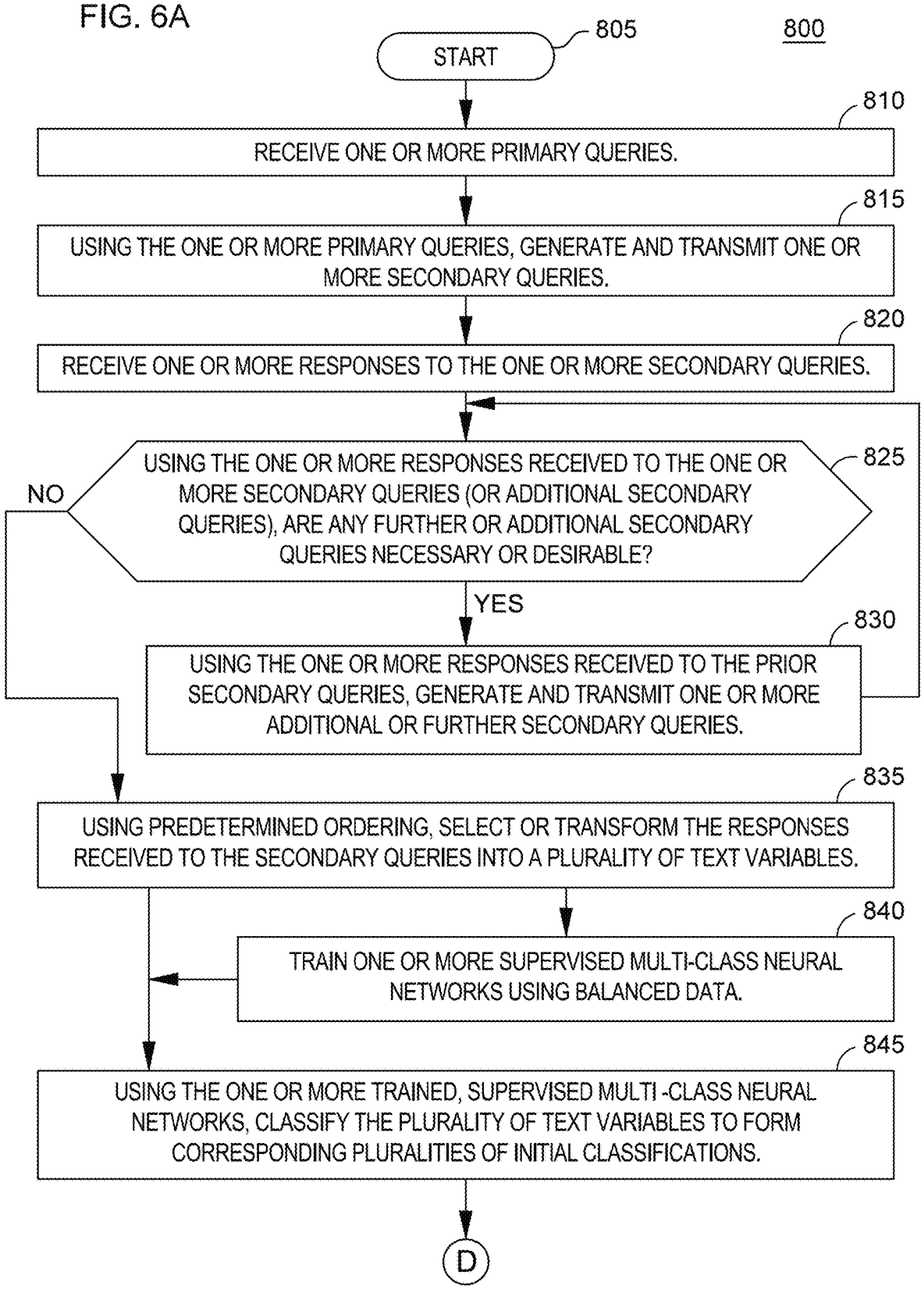

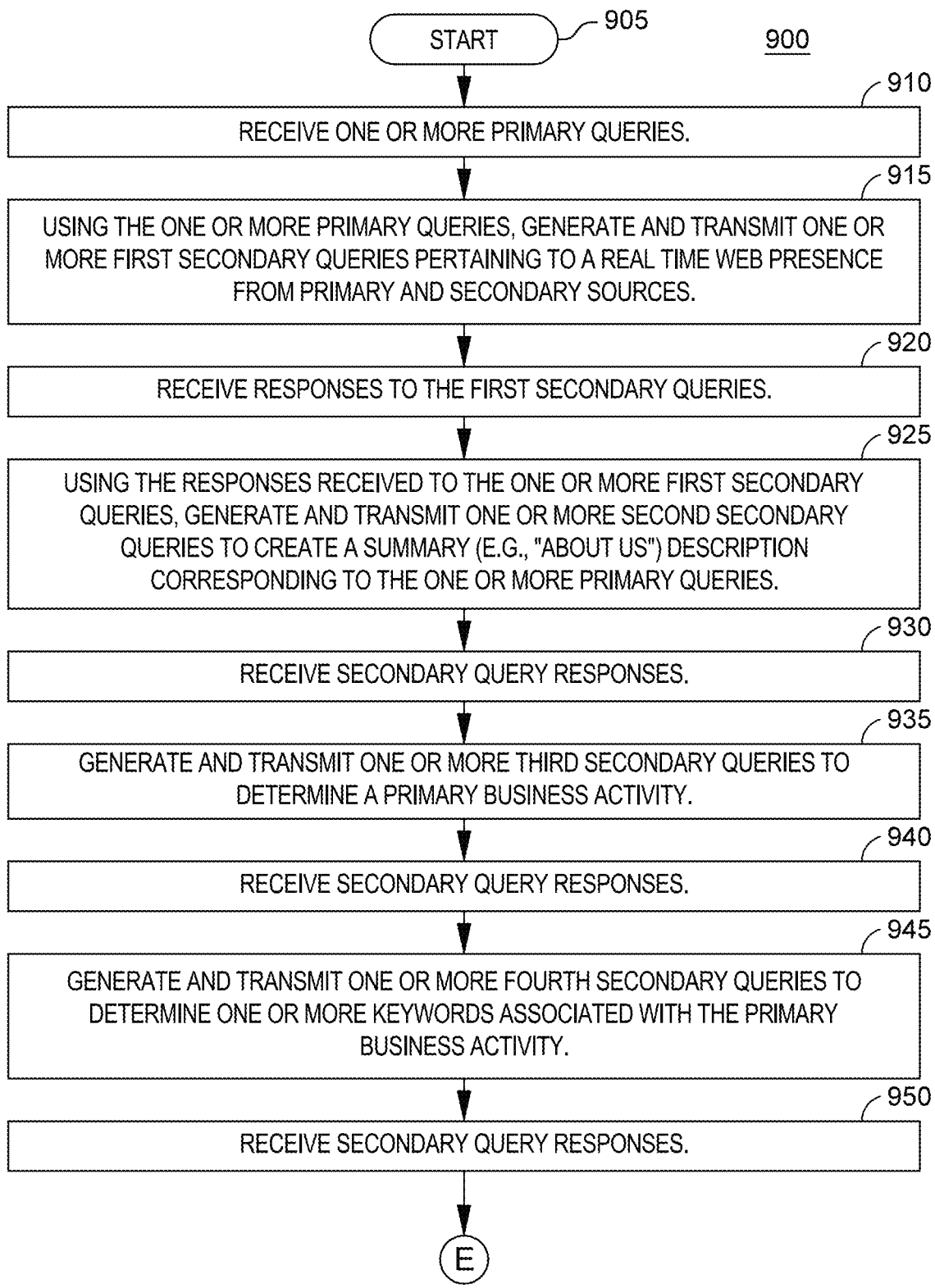

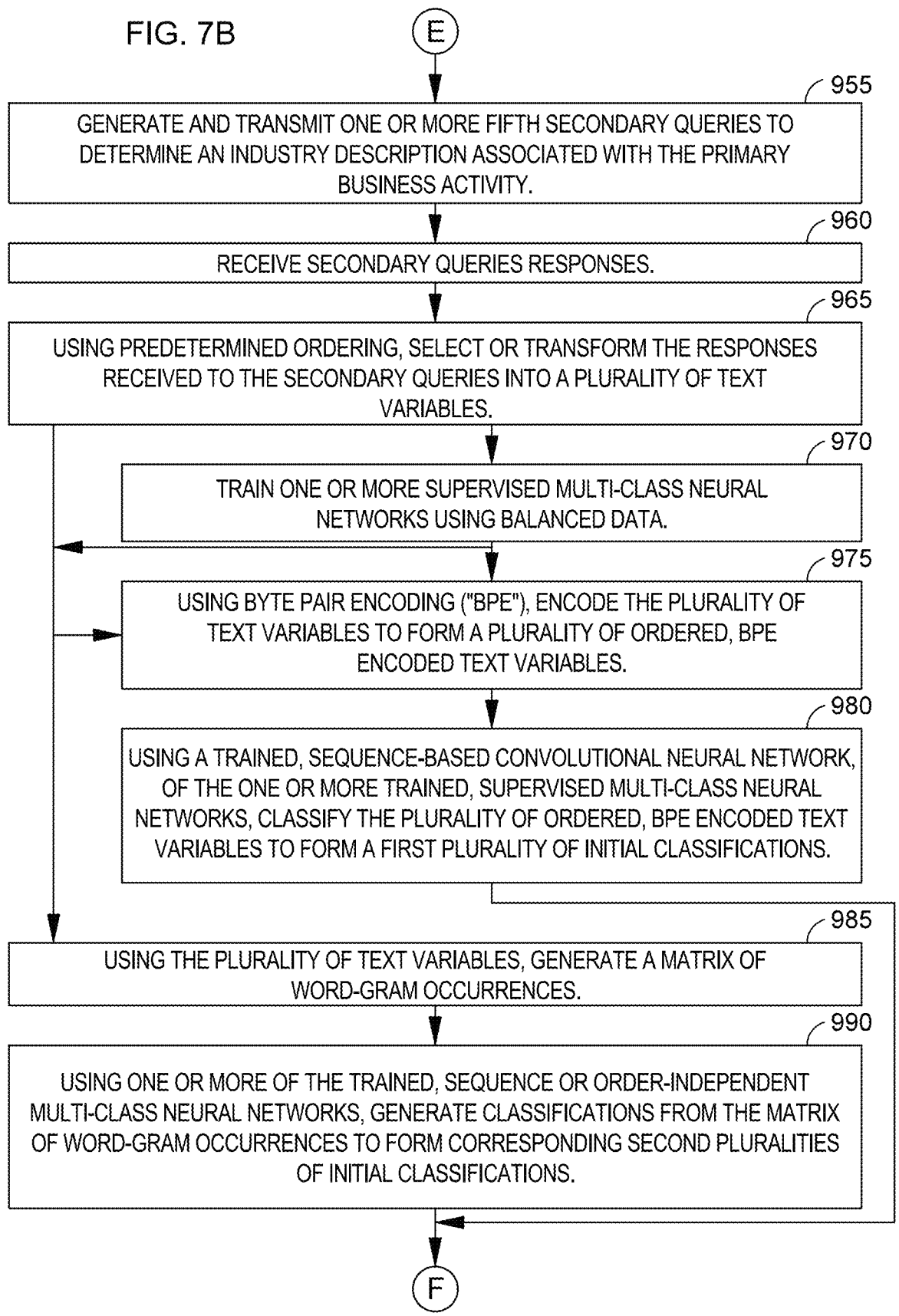

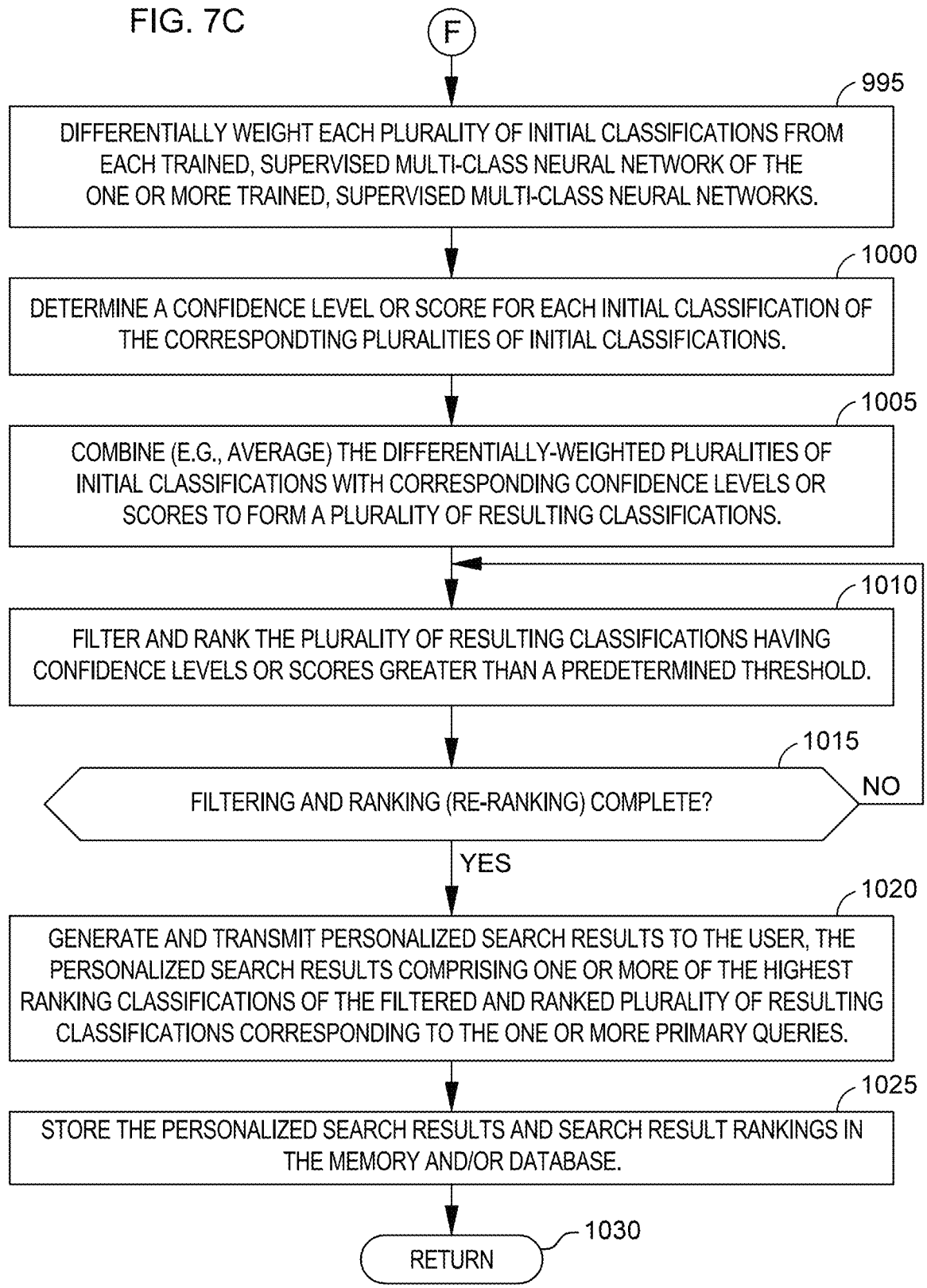

SYSTEM AND METHODS FOR PERSONALIZATION AND CUSTOMIZATION OF SEARCH RESULTS AND SEARCH RESULT RANKING IN AN INTERNET-BASED SEARCH ENGINE

CROSS-REFERENCE TO RELATED APPLICATIONS

This application claims the benefit of and priority to U.S. Provisional Patent Application No. 63/568,360, filed Mar. 21, 2024, and claims the benefit of and priority to U.S. Provisional Patent Application No. 63/539,906, filed Sep. 22, 2023, which are commonly owned herewith, and all of which are hereby incorporated herein by reference in their entireties with the same full force and effect as if set forth in their entireties herein.

FIELD OF THE INVENTION

The present invention relates generally to online search engines, and more specifically to personalization and customization of Internet-based search results and search result ranking in a search engine.

BACKGROUND OF THE INVENTION

The current state of the art in online search engines, generally involving word-based or phrase-based searching, is reasonably advanced in its ability to retrieve documents and websites (e.g., web pages, images, files, links to websites, etc.) that are responsive to the terms of a query, typically searched and retrieved using keywords contained in the query. While such search engines typically return results that accurately correspond to the search terms (keywords) of the query, the search results may not reflect the user's underlying interests and goals.

Additionally, using such keyword searching, too many search results and an insufficient quality of the search results from may be returned by the search engine, creating several problems. First, such a large number of results are returned that the user cannot review all of the results in a reasonable period of time, or within the time allocated for review by the user. Second, because of the large number of results, search providers typically return results which have been ranked according to some criteria applied by the search provider, such as the Google page ranking system based upon the number of links to a selected web page (or website) provided by third parties as an indicator of the importance of the selected web page (or website).

In many cases, the ranked search results are distorted, both by being over-inclusive in the results returned, and by distortion of the rankings of the results. For example, keyword searching can be "gamed", with websites or documents including various keywords simply to be included in ranked results, resulting in over-inclusion of these otherwise irrelevant websites or documents in the search results. Also for example, keywords can be purchased from a search provider, often through a daily bidding process, resulting in distorted search result rankings, with the highest rankings in the search results ("sponsored" results) going to the highest bidder.

Not only does this result in overall inaccuracy of the results returned, but also it increases the amount of data which must be transmitted to the user, much of which is irrelevant and which serves to obscure or bury the relevant data sought by the user of the search engine, essentially hiding the relevant "needle" in the irrelevant "haystack". The increased amount of transmitted data also tends to require larger databases for data storage, larger system server and memory requirements, and further serves to overload various network and Internet systems and effectively increase the overall search time.

In addition, this type of Internet searching may also be under-inclusive, missing the most relevant information which may not utilize the particular keyword and failing to return relevant results.

Another significant problem associated with current Internet search engines is the lack of higher-level, more intelligent assessments and organization of the actual search results returned, resulting in a lack of fully actionable information needed by the user. For example, a user may be interested in determining a relevant, higher-level category, classification, class or other grouping that corresponds to the content of the search query, rather than merely receiving a listing of links to websites, documents, and images. Such higher-level categorization or classification of a search query may be useful in a wide-variety of fields, including for providing medical or surgical diagnoses, medical or surgical diagnostic categories and codes, human resource benefits administration, toxicity determinations for new pharmaceuticals, underwriting and other financial decisions (such as bank loan approval or disapproval), fraud detection, and so on. For example, it would be highly desirable to have an Internet search engine that could return a result of "toxic" or "poisonous" in response to a search query for a chemical structure. Also as examples, it would be highly desirable to have an Internet search engine that could return a result of a particular industry classification code in response to a search query of a business name, such as to determine if a "gaming" business is actually in the video game industry rather than the gambling industry, or determine if an entertainment business is a ballet company rather than an adult entertainment store, or determine if a botanical distribution business is actually a legitimate agricultural entity or is instead a purveyor of illicit or illegal substances.

A need remains, therefore, for a system and methods for personalization of Internet-based search results and search result ranking in a search engine, with an intelligent assessment and organization of the actual search results returned. A need also remains for a system and methods for generating Internet-based search results that includes relevant, higher-level categorization, classification or other grouping that corresponds to the content of the search query. Such a search engine should provide an alternative to keyword searching, and should produce actionable results, such as returning a reasonable number of search results of high quality, that are directly relevant to the personalized search and without being under-inclusive, and further which can be thoroughly reviewed by the user within the user's time allocation. Such a search engine should also result in a decrease in the amount of data required to be stored and decrease the corresponding size of the resulting databases, further serving to decrease the amount of data required to be transmitted and reduce the system load. In addition, such a search engine system and methods should incorporate time sensitivity in the personalized search results.

SUMMARY OF THE INVENTION

The representative or exemplary embodiments of the present invention provide numerous advantages. Representative embodiments provide for a technical, artificial intelligence solution to an Internet-centric problem, using the prior art keyword searching, of over-inclusiveness of search results, under-inclusiveness of relevant information, distorted rankings of search results, and lack of relevant, higher-level categorization, classification or other grouping that corresponds to the content of the search query. The representative embodiments automate the Internet-based searching and selection processes using highly relevant, user-determined characteristics and user-customizable parameters, resulting in personalization of search results and search result ranking, including providing relevant, higher-level categorizations, classifications or other groupings that correspond to the content of the search query. Such higher-level categorization or classification of a search query can be useful in a wide-variety of fields, including for providing medical or surgical diagnoses, medical or surgical diagnostic categories and codes, human resource benefits administration, toxicity determinations for new pharmaceuticals, underwriting and other financial decisions (such as bank loan approval or disapproval), fraud detection, for example and without limitation. The representative embodiments further search and collect information from a plurality of different Internet websites and services, and compiles and transforms all of this different collected information into the relevant, higher-level categorizations, classifications or other groupings that correspond to the content of the search query. The representative embodiments further automate the Internet-based searching and selection processes using highly relevant, user-determined and centrally-located filters, also resulting in personalization of search results and search result ranking.

As a result, the representative embodiments improve the functioning of Internet-based searches, providing highly personalized search results and search result rankings, thereby dramatically decreasing the amount of search time required for a user to discover relevant and actionable information. As a further result, the representative embodiments improve the functioning of Internet-based searches, decreasing the amount of data which must be transmitted to provide the highly personalized search results and search result rankings, decreasing the size of the databases required for data storage, decreasing the system server and memory requirements, and further serving to decrease the load of the various system components, such as the Internet-based servers and routers.

A representative embodiment provides a computer server system coupleable to a network for Internet search and personalization of search results and search result rankings. A representative server system comprises: a network input and output interface configured to transmit and receive data via the network, the network input and output interface further configured to receive a primary query from a user, to transmit a plurality of secondary queries, to receive a plurality of responses to the plurality of secondary queries, and to transmit personalized search results and search result rankings to the user; at least one data storage device configured to store the structure or format of the plurality of secondary queries and to store at least one vector database having a plurality of vectors, each vector of the plurality of vectors having an associated classification or category; and one or more processors configured as a primary search engine and coupled to the at least one data storage device and to the network input and output interface, the one or more processors further configured to access the at least one data storage device; the one or more processors further configured to generate for transmission, using the primary query, at least one first secondary query of the plurality of secondary queries; to generate for transmission, using a first response to the first secondary query, of the plurality of responses to the plurality of secondary queries, a second secondary query of the plurality of secondary queries; to generate for transmission, using a second response to the second secondary query, of the plurality of responses to the plurality of secondary queries, a third secondary query of the plurality of secondary queries; to select and concatenate one or more responses to the second and third secondary queries, of the plurality of responses to the plurality of secondary queries, to form a response concatenation; using a search vector formed from the response concatenation, to perform a vector search of the vector database and obtain one or more associated classifications or categories; to filter and rank the one or more associated classifications or categories; and the one or more processors further configured to use the filtered and ranked one or more associated classifications or categories to generate and output the personalized search results and search result rankings, the personalized search results and search result rankings comprising one or more associated classifications or categories corresponding to the primary query.

In a representative embodiment, the one or more processors are further configured to generate the first secondary query having a corresponding first data payload, the first data payload comprising at least a portion of the primary query, and the first secondary query further having a first destination address for transmission to a secondary search engine. In a representative embodiment, the one or more processors are further configured to generate an initial context from the first response to the first secondary query, the initial context comprising a collection of descriptions, descriptive words, and keywords obtained by an Internet search of the at least a portion of the primary query from the secondary internet search engine.

In a representative embodiment, the one or more processors are further configured to generate the second secondary query having a corresponding second data payload comprising a plurality of descriptions, descriptive words, and keywords, and having a second destination address for transmission to an artificial intelligence server. In a representative embodiment, one or more processors are further configured to generate the second secondary query as a prompt or directive to the artificial intelligence server to generate a summary description from the plurality of descriptions, descriptive words, and keywords. In a representative embodiment, the artificial intelligence server is selected from the group consisting of: a Generative Pre-trained Transformer 4 (GPT-4) server, a ChatGPT server, a ChatGPT Plus server, Amazon Web Services (AWS) Titan, Anthropic Claude, AI21 Labs Jurassic, Meta AI's Llama, and combinations thereof.

In a representative embodiment, the at least one data storage device is further configured to store the structure or format of a vector embedding message. In a representative embodiment, the network input and output interface is further configured to transmit a vector embedding message via the network and to receive a response vector message via the network, and wherein the one or more processors are further configured to generate the vector embedding message for transmission, the vector embedding message having the response concatenation, and to obtain the search vector from the received response vector message. In a representative embodiment, the one or more processors are further configured to generate the vector embedding message comprising a third destination address for transmission to an embedding model server, and further comprising a prompt or directive to the embedding model server to form the search vector from the response concatenation. In a representative embodiment, the embedding model server is configured to perform a text-embedding-ada-002 embedding model.

In a representative embodiment, the one or more processors are further configured to generate the third secondary query having a corresponding third data payload comprising the summary description, the third secondary query further comprising the second destination address for transmission to the artificial intelligence server, and further comprising a prompt or directive to the artificial intelligence server to determine a description of an associated primary activity from the summary description.

In another representative embodiment, the one or more processors are further configured to generate a fourth secondary query having a corresponding fourth data payload, the fourth data payload comprising a description of an associated primary activity, the fourth secondary query further comprising a second destination address for transmission to an artificial intelligence server, and further comprising a prompt or directive to the artificial intelligence server to determine one or more keywords from the description of the associated primary activity.

In another representative embodiment, the one or more processors are further configured to generate a fifth secondary query having a corresponding fifth data payload, the fifth data payload comprising one or more keywords, the fifth secondary query further comprising a second destination address for transmission to an artificial intelligence server, and further comprising a prompt or directive to the artificial intelligence server to determine an industry description from the one or more keywords.

In another representative embodiment, the one or more processors are further configured to generate a sixth secondary query having a corresponding sixth data payload, the sixth data payload comprising at least a portion of an industry description, the sixth secondary query further comprising a second destination address for transmission to an artificial intelligence server, and further comprising a prompt or directive to the artificial intelligence server to determine a similarity and difference description.

In a representative embodiment, one or more processors are further configured to filter and rank the one or more associated classifications or categories by generating a seventh secondary query comprising a second destination address for transmission to an artificial intelligence server, and further comprising a prompt or directive to the artificial intelligence server to perform a similarity comparison of each description associated with or corresponding to each of the categories or classifications resulting from the vector search of the database with an industry description.

In another representative embodiment, the one or more processors are further configured to filter and rank the one or more associated classifications or categories using a vector distance determination and to select at least one associated classification or category from the one or more associated classifications or categories having a closest or smallest vector distance.

In another representative embodiment, the one or more processors are further configured to filter and rank the one or more associated classifications or categories using a vector goodness of fit determination and to select at least one associated classification or category from the one or more associated classifications or categories having a highest or greatest goodness of fit.

In a representative embodiment, the one or more processors are further configured to store the personalized search results and search result rankings in the vector database using the vector and at least one associated classification or category of the one or more associated classifications or categories.

A computer server-implemented method for Internet search and personalization of search results and search result rankings is also disclosed. In a representative embodiment, the computer server-implemented method comprises: using a network input and output interface of the computer server, receiving a primary query from a user; using one or more processors of the computer server configured as a primary search engine, and using the primary query, generating at least one first secondary query of a plurality of secondary queries; using the network input and output interface, transmitting the at least one first secondary query having a first destination address to a secondary search engine; using the one or more processors, and using a first response to the first secondary query, generating a second secondary query of the plurality of secondary queries; using the network input and output interface, transmitting the second secondary query having a second destination address to an artificial intelligence server; using the one or more processors, and using a second response to the second secondary query, generating a third secondary query of the plurality of secondary queries; using the network input and output interface, transmitting the third secondary query having the second destination address to the artificial intelligence server; using the one or more processors, selecting and concatenating one or more responses to the second and third secondary queries, to form a response concatenation; using the one or more processors, and using a search vector formed from the response concatenation, performing a vector search of a vector database, the vector database comprising a plurality of vectors having associated classifications or categories, and obtaining one or more associated classifications or categories; using the one or more processors, filtering and ranking the one or more associated classifications or categories; using the one or more processors, and using the filtered and ranked one or more associated classifications or categories, generating the personalized search results and search result rankings, the personalized search results and search result rankings comprising one or more associated classifications or categories corresponding to the primary query; and using the network input and output interface, transmitting the personalized search results and search result rankings to the user.

In a representative embodiment, the computer server-implemented method may further comprise: using the one or more processors, generating a vector embedding message, the vector embedding message comprising the response concatenation and a prompt or directive to form the search vector from the response concatenation; using the network input and output interface, transmitting the vector embedding message, the vector embedding message further comprising a third destination address to an embedding model server; using the network input and output interface, receiving a response vector message; and using the one or more processors, obtaining the search vector from the received response vector message.

In a representative embodiment, the step of generating the first secondary query may further comprise: using the one or more processors, generating the first secondary query having a corresponding first data payload, the first data payload comprising at least a portion of the primary query.

In a representative embodiment, the computer server-implemented method may further comprise: using the one or more processors, generating an initial context from the first response to the first secondary query, the initial context comprising a collection of descriptions, descriptive words, and keywords obtained by an Internet search of the at least a portion of the primary query from the secondary internet search engine.

In a representative embodiment, the step of generating the second secondary query may further comprise: using the one or more processors, generating the second secondary query comprising a corresponding second data payload having a plurality of descriptions, descriptive words, and keywords, the second secondary query further comprising a prompt or directive to the artificial intelligence server to generate a summary description from the plurality of descriptions, descriptive words, and keywords.

In a representative embodiment, the step of generating the third secondary query may further comprise: using the one or more processors, generating the third secondary query comprising a corresponding third data payload having the summary description, the third secondary query further comprising a prompt or directive to the artificial intelligence server to determine a description of an associated primary activity from the summary description.

In another representative embodiment, the computer server-implemented method may further comprise: using the one or more processors, generating a fourth secondary query having a corresponding fourth data payload, the fourth data payload comprising a description of an associated primary activity, the fourth secondary query further comprising the second destination address for transmission to the artificial intelligence server, and further comprising a prompt or directive to the artificial intelligence server to determine one or more keywords from the description of the associated primary activity.

In another representative embodiment, the computer server-implemented method may further comprise: using the one or more processors, generating a fifth secondary query having a corresponding fifth data payload, the fifth data payload comprising one or more keywords, the fifth secondary query further comprising the second destination address for transmission to an artificial intelligence server, and further comprising a prompt or directive to the artificial intelligence server to determine an industry description from the one or more keywords.

In another representative embodiment, the computer server-implemented method may further comprise: using the one or more processors, generating a sixth secondary query having a corresponding sixth data payload, the sixth data payload comprising at least a portion of an industry description, the sixth secondary query further comprising the second destination address for transmission to the artificial intelligence server, and further comprising a prompt or directive to the artificial intelligence server to determine a similarity and difference description.

In a representative embodiment, the step of filtering and ranking the one or more associated classifications or categories may further comprise: using the one or more processors, generating a seventh secondary query comprising the second destination address for transmission to the artificial intelligence server, and further comprising a prompt or directive to the artificial intelligence server to perform a similarity comparison of each description associated with or corresponding to each of the categories or classifications resulting from the vector search of the database with an industry description.

In another representative embodiment, the step of filtering and ranking the one or more associated classifications or categories may further comprise: using the one or more processors, determining a vector distance and selecting at least one associated classification or category from the one or more associated classifications or categories having a closest or smallest vector distance.

In another representative embodiment, the step of filtering and ranking the one or more associated classifications or categories may further comprise: using the one or more processors, determining a vector goodness of fit and selecting at least one associated classification or category from the one or more associated classifications or categories having a highest or greatest goodness of fit.

In a representative embodiment, the computer server-implemented method may further comprise: using the one or more processors, storing the personalized search results and search result rankings in the vector database using the search vector and at least one associated classification or category of the one or more associated classifications or categories.

In another representative embodiment, a representative server system comprises: a network input and output interface configured to transmit and receive network data, the network input and output interface further configured to receive a primary query from a user via the network, to transmit a plurality of secondary queries via the network, to receive a plurality of responses to the plurality of secondary queries via the network, to transmit a vector embedding message via the network, to receive a response vector message via the network, and to transmit personalized search results and search result rankings to the user via the network; at least one data storage device configured to store the structure or format of the plurality of secondary queries and to store the structure or format of the vector embedding message, the at least one data storage device further configured to store at least one vector database having a plurality of vectors, each vector of the plurality of vectors having an associated classification or category; and one or more processors configured as a primary search engine and coupled to the at least one data storage device and to the network input and output interface, the one or more processors further configured to access the at least one data storage device; the one or more processors further configured:

to generate for transmission, using the primary query, at least one first secondary query of the plurality of secondary queries, the first secondary query having a corresponding first data payload, the first data payload comprising at least a portion of the primary query, and the first secondary query further having a first destination address for transmission to a secondary search engine;

to generate an initial context from a first response to the first secondary query, the initial context comprising a collection of descriptions, descriptive words, and keywords obtained by an Internet search of the at least a portion of the primary query from the secondary internet search engine to generate a second secondary query of the plurality of secondary queries for transmission, the second secondary query having a corresponding second data payload comprising the plurality of descriptions, descriptive words, and keywords, and having a second destination address for transmission to an artificial intelligence server a prompt or directive to the artificial intelligence server to generate a summary description from the plurality of descriptions, descriptive words, and keywords;

to generate a third secondary query of the plurality of secondary queries for transmission, the third secondary query having a corresponding third data payload comprising the summary description, the third secondary query further comprising the second destination address and a prompt or directive to the artificial intelligence server to determine a description of an associated primary activity from the summary description;

to generate a fourth secondary query having a corresponding fourth data payload, the fourth data payload comprising the description of the associated primary activity, the fourth secondary query further comprising the second destination address and a prompt or directive to the artificial intelligence server to determine one or more keywords from the description of the associated primary activity;

to generate a fifth secondary query having a corresponding fifth data payload, the fifth data payload comprising one or more keywords, the fifth secondary query further comprising the second destination address and a prompt or directive to the artificial intelligence server to determine an industry description from the one or more keywords;

to generate a sixth secondary query having a corresponding sixth data payload, the sixth data payload comprising at least a portion of the industry description, the sixth secondary query further comprising the second destination address and a prompt or directive to the artificial intelligence server to determine a similarity and difference description;

to select and concatenate one or more responses to the third, fourth, fifth, and sixth secondary queries, of the plurality of responses to the plurality of secondary queries, to form a response concatenation;

to generate the vector embedding message for transmission, the vector embedding message having the response concatenation;

to obtain a search vector from the received response vector message;

using the search vector, to perform a vector search of the vector database and obtain one or more associated classifications or categories;

to filter and rank the one or more associated classifications or categories; and to use the filtered and ranked one or more associated classifications or categories to generate and output the personalized search results and search result rankings, the personalized search results and search result rankings comprising one or more associated classifications or categories corresponding to the primary query.

Another representative embodiment provides a computer server system coupleable to a network for Internet search and personalization of search results and search result rankings, the computer server system comprising: a network input and output interface configured to transmit and receive data via the network, the network input and output interface further configured to receive a primary query from a user, to transmit a plurality of secondary queries, to receive a plurality of responses to the plurality of secondary queries, and to transmit personalized search results and search result rankings to the user; at least one data storage device configured to store the structure or format of the plurality of secondary queries; and one or more processors configured as a primary search engine and coupled to the at least one data storage device and to the network input and output interface, the one or more processors further configured to access the at least one data storage device; the one or more processors further configured to generate for transmission, using the primary query, at least one first secondary query of the plurality of secondary queries; to generate for transmission, using a first response to the first secondary query, of the plurality of responses to the plurality of secondary queries, a second secondary query of the plurality of secondary queries; to generate for transmission, using a second response to the second secondary query, of the plurality of responses to the plurality of secondary queries, a third secondary query of the plurality of secondary queries; to extract or transform one or more responses to the second and third secondary queries, of the plurality of responses to the plurality of secondary queries, into a plurality of text variables; using a plurality of trained, supervised multi-class neural networks, to classify the plurality of text variables to form corresponding pluralities of initial classifications or categories; to combine the corresponding pluralities of initial classifications or categories to form a plurality of resulting classifications or categories; to filter and rank the plurality of resulting classifications or categories; and the one or more processors further configured to use the filtered and ranked plurality of resulting classifications or categories to generate and output the personalized search results and search result rankings, the personalized search results and search result rankings comprising one or more associated classifications or categories corresponding to the primary query.

In a representative embodiment, the one or more processors are further configured to generate the first secondary query having a corresponding first data payload, the first data payload comprising at least a portion of the primary query, and the first secondary query further having a first destination address for transmission to a secondary search engine. In a representative embodiment, the one or more processors are further configured to generate the second secondary query from the first response to the first secondary query, the second secondary query comprising a collection of descriptions, descriptive words, and keywords obtained by an Internet search of the at least a portion of the primary query from the secondary internet search engine.

In a representative embodiment, the one or more processors are further configured to generate the second secondary query as a prompt or directive to the artificial intelligence server to generate a summary description from the first response to the first secondary query.

In a representative embodiment, the one or more processors are further configured to generate the third secondary query comprising a prompt or directive to the artificial intelligence server to determine a description of an associated primary activity from the summary description. In a representative embodiment, the one or more processors are further configured to generate a fourth secondary query comprising a prompt or directive to the artificial intelligence server to determine one or more keywords from the description of the associated primary activity. In a representative embodiment, the one or more processors are further configured to generate a fifth secondary query comprising a prompt or directive to the artificial intelligence server to determine an industry description from the associated primary activity.

In another representative embodiment, the one or more processors are further configured to encode the plurality of text variables using byte-pair encoding. In a representative embodiment, the one or more processors are further configured to use a trained, sequence-based convolutional neural network, of the plurality of trained, supervised multi-class neural networks, to classify the plurality of ordered, byte-pair encoded ("BPE") text variables to form a first plurality of initial classifications.

In another representative embodiment, the one or more processors are further configured to generate a matrix of word-gram occurrences using the plurality of text variables. In a representative embodiment, the one or more processors are further configured to generate classifications from the matrix of word-gram occurrences using a plurality of trained, sequence or order-independent multi-class neural networks, of the plurality of trained, supervised multi-class neural networks, to form corresponding second pluralities of initial classifications. In a representative embodiment, the one or more processors are further configured to determine a confidence level or score for each initial classification of the corresponding pluralities of initial classifications and combine the pluralities of initial classifications with corresponding confidence levels or scores to form the plurality of resulting classifications. In a representative embodiment, the one or more processors are further configured to differentially weight each plurality of initial classifications from each trained, supervised multi-class neural network of the plurality of trained, supervised multi-class neural networks. In a representative embodiment, the one or more processors are further configured to determine a confidence level or score for each initial classification of the corresponding pluralities of initial classifications. In a representative embodiment, the one or more processors are further configured to average the differentially-weighted pluralities of initial classifications with corresponding confidence levels or scores to form the plurality of resulting classifications.

Another computer server-implemented method for Internet search and personalization of search results and search result rankings is also disclosed. In a representative embodiment, the computer server-implemented method comprises: using a network input and output interface of the computer server, receiving a primary query from a user; using one or more processors of the computer server configured as a primary search engine, and using the primary query, generating at least one first secondary query of a plurality of secondary queries; using the network input and output interface, transmitting the at least one first secondary query having a first destination address to a secondary search engine; using the one or more processors, and using a first response to the first secondary query, generating a second secondary query of the plurality of secondary queries; using the network input and output interface, transmitting the second secondary query having a second destination address to an artificial intelligence server; using the one or more processors, and using a second response to the second secondary query, generating a third secondary query of the plurality of secondary queries; using the network input and output interface, transmitting the third secondary query having the second destination address to the artificial intelligence server; using the one or more processors, transforming one or more responses to the second and third secondary queries, of the plurality of responses to the plurality of secondary queries, into a plurality of text variables; using the one or more processors, and using a plurality of trained, supervised multi-class neural networks, classifying the plurality of text variables to form corresponding pluralities of initial classifications or categories; using the one or more processors, combining the corresponding pluralities of initial classifications or categories to form a plurality of resulting classifications or categories; using the one or more processors, filtering and ranking the plurality of resulting classifications or categories; using the one or more processors, and using the filtered and ranked plurality of resulting classifications or categories, generating the personalized search results and search result rankings, the personalized search results and search result rankings comprising one or more associated classifications or categories corresponding to the primary query; and using the network input and output interface, transmitting the personalized search results and search result rankings to the user.

In a representative embodiment, the computer server-implemented method may further comprise: using the one or more processors, encoding the plurality of text variables using byte-pair encoding. In a representative embodiment, the computer server-implemented method may further comprise: using the one or more processors, and using a trained, sequence-based convolutional neural network, of the plurality of trained, supervised multi-class neural networks, classifying the plurality of ordered, BPE text variables to form a first plurality of initial classifications.

In a representative embodiment, the computer server-implemented method may further comprise: using the one or more processors, generating a matrix of word-gram occurrences using the plurality of text variables. In a representative embodiment, the computer server-implemented method may further comprise: using the one or more processors, generating classifications from the matrix of word-gram occurrences using a plurality of trained, sequence or order-independent multi-class neural networks, of the plurality of trained, supervised multi-class neural networks, to form corresponding second pluralities of initial classifications.

In a representative embodiment, the computer server-implemented method may further comprise: using the one or more processors, determining a confidence level or score for each initial classification of the corresponding pluralities of initial classifications and combining the pluralities of initial classifications with corresponding confidence levels or scores to form the plurality of resulting classifications. In a representative embodiment, the computer server-implemented method may further comprise: using the one or more processors, differentially weighting each plurality of initial classifications from each trained, supervised multi-class neural network of the plurality of trained, supervised multi-class neural networks. In a representative embodiment, the computer server-implemented method may further comprise: using the one or more processors, determining a confidence level or score for each initial classification of the corresponding pluralities of initial classifications. In a representative embodiment, the computer server-implemented method may further comprise: using the one or more processors, averaging the differentially-weighted pluralities of initial classifications with corresponding confidence levels or scores to form the plurality of resulting classifications.

Another representative embodiment provides a computer server system coupleable to a network for Internet search and personalization of search results and search result rankings, the computer server system comprising: a network input and output interface configured to transmit and receive data via the network, the network input and output interface further configured to receive a primary query from a user, to transmit a plurality of secondary queries, to receive a plurality of responses to the plurality of secondary queries, and to transmit personalized search results and search result rankings to the user; at least one data storage device configured to store the structure or format of the plurality of secondary queries; and one or more processors configured as a primary search engine and coupled to the at least one data storage device and to the network input and output interface, the one or more processors further configured to access the at least one data storage device; the one or more processors further configured to generate for transmission, using the primary query, at least one first secondary query of the plurality of secondary queries; to generate for transmission, using a first response to the first secondary query, of the plurality of responses to the plurality of secondary queries, a second secondary query of the plurality of secondary queries; to generate for transmission, using a second response to the second secondary query, of the plurality of responses to the plurality of secondary queries, a third secondary query of the plurality of secondary queries; to extract or transform one or more responses to the second and third secondary queries, of the plurality of responses to the plurality of secondary queries, into a plurality of text variables; to encode the plurality of text variables using byte-pair encoding; to use a trained, sequence-based convolutional neural network, of the plurality of trained, supervised multi-class neural networks, to classify the plurality of ordered, BPE text variables to form a first plurality of initial classifications; to generate a matrix of word-gram occurrences using the plurality of text variables; to generate classifications from the matrix of word-gram occurrences using a plurality of trained, sequence or order-independent multi-class neural networks, of the plurality of trained, supervised multi-class neural networks, to form corresponding second pluralities of initial classifications; the one or more processors further configured to combine the initial classifications or categories to form a plurality of resulting classifications or categories; to filter and rank the plurality of resulting classifications or categories; and the one or more processors further configured to use the filtered and ranked plurality of resulting classifications or categories to generate and output the personalized search results and search result rankings, the personalized search results and search result rankings comprising one or more associated classifications or categories corresponding to the primary query.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 4A and 4B (collectively referred to as FIG. 4) is a flow diagram illustrating an exemplary or representative first method embodiment for personalization of search results and search result ranking in a search engine.

FIGS. 5A, 5B and 5C (collectively referred to as FIG. 5) is a flow diagram illustrating an exemplary or representative second method embodiment for personalization of search results and search result ranking in a search engine, more specifically applied to generating search results which includes business categorizations or classifications.

FIGS. 6A and 6B (collectively referred to as FIG. 6) is a flow diagram illustrating an exemplary or representative third method embodiment for personalization of search results and search result ranking in a search engine.

FIGS. 7A, 7B and 7C (collectively referred to as FIG. 7) is a flow diagram illustrating an exemplary or representative fourth method embodiment for personalization of search results and search result ranking in a search engine, more specifically applied to generating search results which includes business categorizations or classifications.

DETAILED DESCRIPTION OF REPRESENTATIVE EMBODIMENTS

Figure 1:
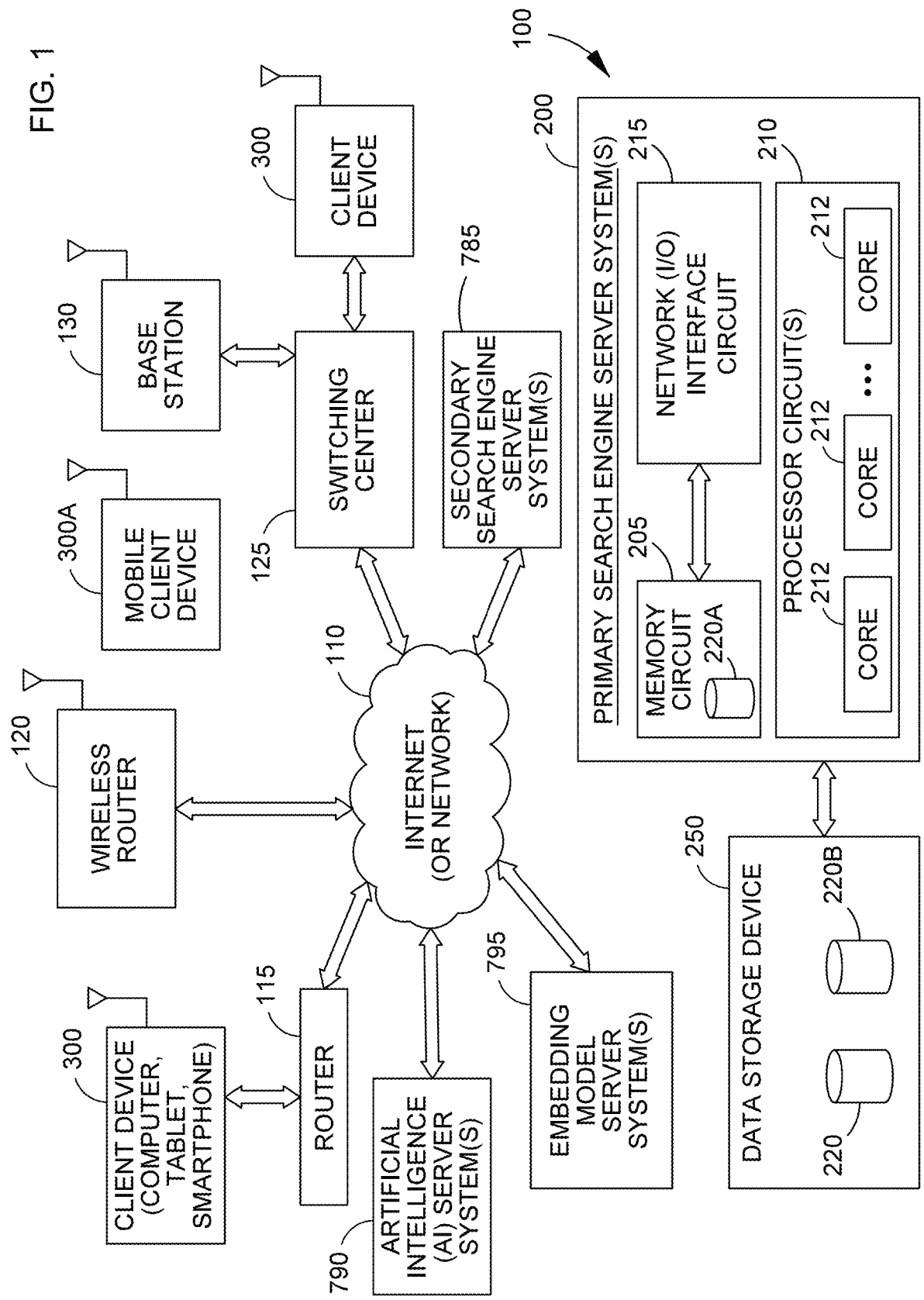
FIG. 1 is a block diagram illustrating an exemplary or representative system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

As described in greater detail below, the representative embodiments provide a technical, artificial intelligence solution to an Internet-centric problem of over-inclusiveness of search results and distorted rankings of search results using the prior art keyword searching. Just as a computing system uses sensor information and reverse-Bayesian computations to enable driving an automobile without human control, the representative embodiments automate the Internet-based searching and selection processes using highly relevant, user-determined characteristics and user-customizable parameters, resulting in personalization of search results, customized filtering and search result ranking, including relevant, higher-level categorization, classification or other grouping that corresponds to the content of the search query. Stated another way, the representative embodiments employ artificial intelligence, search personalization, and customized search filtering to "match" information to a user and provide the relevant and ranked information the user wants or needs (if available) at the point in time wanted or needed, without inundating the user with thousands of responses or documents which the user cannot possibly review in a reasonable or allocated time.

The representative embodiments automate the Internet-based searching and selection processes using highly relevant, user-determined characteristics and user-customizable parameters, resulting in personalization of search results and search result ranking, including providing relevant, higher-level categorization, classification or other grouping that corresponds to the content of the search query. Such higher-level categorization or classification of a search query can be useful in a wide-variety of fields, including for providing medical or surgical diagnoses, medical or surgical diagnostic categories and codes, human resource benefits administration, toxicity determinations for new pharmaceuticals, underwriting and other financial decisions (such as bank loan approval or disapproval), and fraud detection, for example and without limitation. In a representative embodiment, a classification or category returned as search results may be a North American Industry Classification System ("NAICS") code or classification and/or a Standard Industrial Classification ("SIC") code or classification, for example and without limitation. The representative embodiments further automate the Internet-based searching and selection processes using highly relevant, user-determined and centrally-located filters, also resulting in personalization of search results and search result ranking.

As described in greater detail below, the representative embodiments improve the functioning of Internet-based searches, providing highly personalized search results, search filtering, and search result rankings, thereby dramatically decreasing the amount of search time required for a user to discover relevant and actionable information. Such representative embodiments also result in a decrease in the amount of data required to be stored and decrease the corresponding size of the resulting databases, further serving to decrease the amount of data required to be transmitted and reduce the system load. In addition, representative embodiments incorporate time sensitivity in the personalized search results and provide corresponding user notifications.

Figure 2:
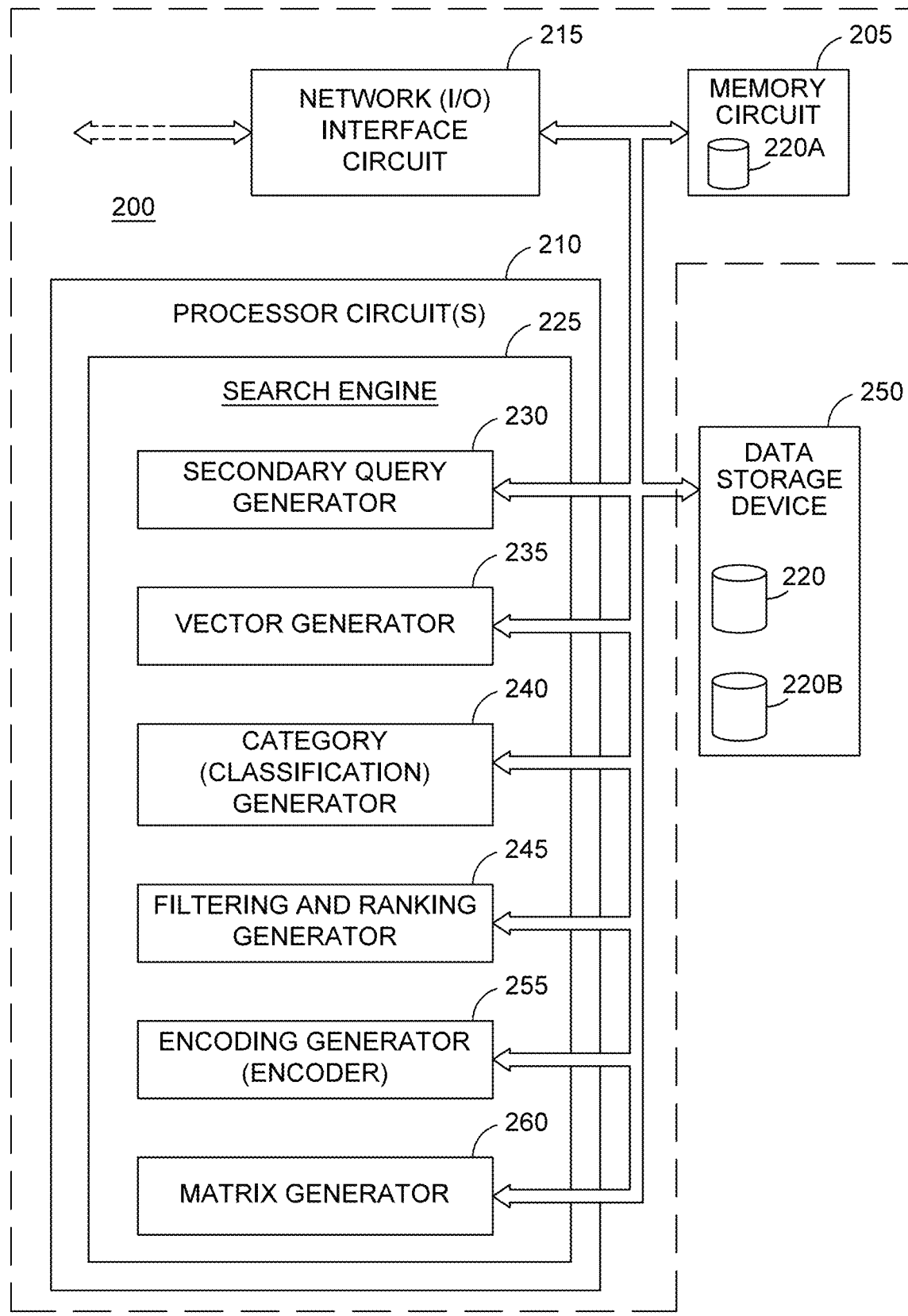
FIG. 2 is a block diagram illustrating an exemplary or representative server system or apparatus embodiment.
Figure 3:
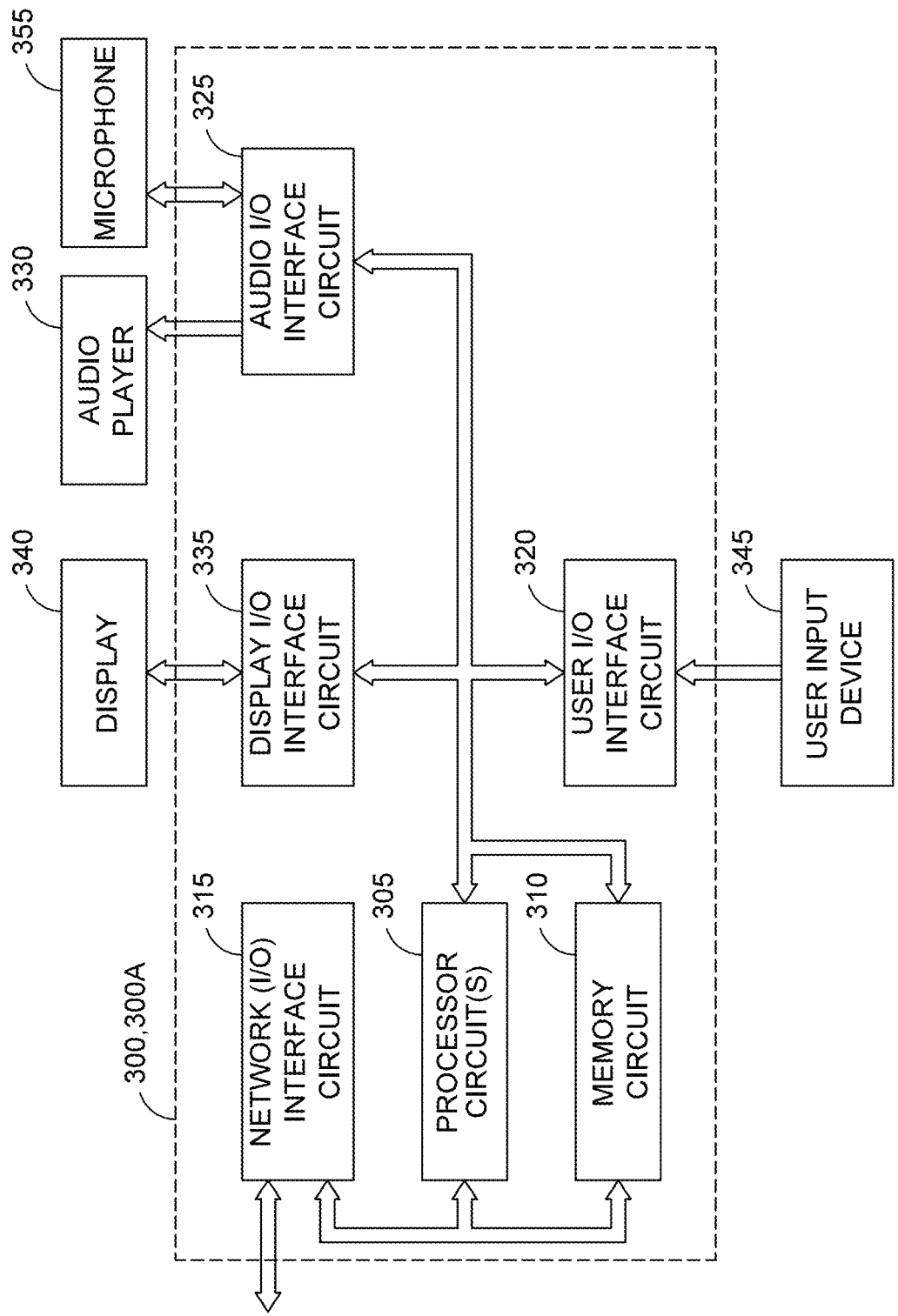
FIG. 3 is a block diagram illustrating an exemplary or representative client device embodiment.

FIG. 1 is a block diagram illustrating an exemplary or representative search system 100 for personalization of search results and search result ranking in an Internet search engine. FIG. 2 is a block diagram illustrating an exemplary or representative (Internet-based or "cloud" based) server system (equivalently referred to as a computer server) or apparatus 200 for personalization of search results and search result ranking in an Internet search engine, typically utilized in the search system 100. FIG. 3 is a block diagram illustrating an exemplary or representative client device 300. The system 100 is an example of an information retrieval system in which the systems, components and techniques described below can be implemented. Although several components are illustrated, there may be fewer or more components in the system 100. Moreover, the components can be distributed on one or more computing devices connected by one or more networks or other suitable communication mediums.

Referring to FIGS. 1-3, as illustrated, the exemplary search system 100 comprises at least one computer server system or apparatus 200, configured as a primary search engine server system(s), coupled through a network 110 (such as the Internet) (along with other network equipment and various components such as a router 115, a wireless router 120, a switching center 125 and/or base station 130) to a plurality of client devices 300, 300A. FIG. 1 further illustrates the network (Internet) 110 connectivity for data and other communication between and among the computer server system or apparatus 200 (configured as a primary search engine server system(s)) and various other servers and/or systems discussed in greater detail below, including a secondary search engine server system(s) 785, an artificial intelligence ("AI") server system(s) 790, and an embedding model server system(s) 795. A user can interact with the search system 100 through one or more client devices 300, 300A. Representative client devices 300, 300A include, for example and without limitation, a computer, a supercomputer, a personal computer, an engineering workstation, a mainframe computer, a tablet computing device, a mobile telephone or smartphone, or any other type of data processing device. For example, the client device 300, 300A can be a computer terminal within a local area network (LAN) or wide area network (WAN).

Continuing to refer to FIG. 1, as illustrated, the exemplary network 110 may be of any type of kind, using any medium such as wired, optical, or wireless, using any current or future protocols, such as Internet Protocol ("IP"), Transmission Control Protocol ("TCP") (collectively with IP referred to as "TCP/IP"), which may further incorporate other current or future protocols, such as hypertext transfer protocol ("HTTP"), various email and file transfer protocols (e.g., SMTP, FTP), or other types of networks, such as the public switched telephone network ("PSTN"), cellular, LTE, GSM, EDGE, GPRS, Institute of Electrical and Electronic Engineers ("IEEE") 802.11, CDMA, WCDMA, or 3G, or any other network which provides for communication for data, voice or multimedia, for user input, selection, evaluation, reporting, media provision, and so on. The network 110, in turn, may be utilized to provide any type of communication between and among the at least one computer server system or apparatus 200, the client devices 300, 300A, and any of the other illustrated devices, and may be directly or indirectly coupled to any of a plurality of such devices for such Internet, voice, multimedia or any other form of data communication, whether switched or routed, including without limitation router(s) 115, wireless router(s) 120, and server(s) 200 of any type or kind (and which may be further coupled to one or more database(s) 220, such as stored in a data storage device 250), switching center(s) 125 (including mobile switching centers), and wireless base station(s) 130, such as for communication to a mobile or cellular client device 300, 300A. For example, the network 110 may be the Internet, or a public or private LAN or WAN.

A user can connect to the search engine 225 within a server system 200 to submit a query and receive search results, as discussed in greater detail below with reference to FIGS. 4-8. When the user submits the query through a user input device 345 attached to or forming part of a client device 300, 300A (such as a keyboard, a touch screen, a mouse, etc.), a client-side query signal is sent into a network 110 and is forwarded to the server system 200 as a server-side query signal. Server system 200 can be one or more server devices in one or more locations. A server device 200 includes at least one processor circuit 210 (also referred to equivalently as a "processor" 210), which can include the search engine 225 loaded or configured therein. A processor circuit 210 (or a plurality of processor circuits 210) is or are structured, configured, adapted or otherwise programmed to process instructions, commands or other code within the server system (or apparatus) 200. These instructions, commands or other code can implement one or more components of the search engine 225. The processor circuit 210 can be a single-threaded processor or a multi-threaded processor, and can include multiple processing cores 212. The processor circuit 210 can process instructions stored in the memory 205 related to the search engine 225 and can send information to the client devices 300, 300A, through the network 110, to create a graphical presentation in a user interface of the client device 300, 300A (e.g., a search results web page displayed in a web browser, such as using HTML, XML, Javascript, etc., alone or in combination with each other).

For example, in system 100, a server system (or apparatus) 200 may be utilized to provide the personalization of search results and search result ranking in a search engine, interactively with a client device 300, 300A such as a computer or mobile smartphone, via network 110 (e.g., Internet). For such an embodiment, a series of graphical user interfaces (such as provided by a web browser) may be displayed on a client device 300, 300A, such as a computer or smartphone, with the user inputting information and making the various parameter and query selections described below, which information and parameter selections are then transmitted to the server system (or apparatus) 200. In turn, the personalization of search results, customized filtering and personalization of search result ranking is performed by the server system (or apparatus) 200, using a search engine 225 (described below), and provides the personalization of search results and search result ranking (such as in the form of an HTML XML or scripting file) to the client device 300, 300A for display and selection via the one or more graphical user interfaces or web browsers.

For example, representative embodiments of the subject matter described in this specification may be implemented in a computing system that includes a back-end or a middleware component, such as a server system or apparatus 200, or that includes a front-end component such as client devices 300, 300A having an interactive graphical user interface or a web browser (either or both of which may display graphical user interfaces), or any combination of one or more such back-end, middleware, or front-end components. The components of the system can be interconnected by any form or medium of digital data communication, such as the illustrated network or internet 110 as a representative communication network (e.g., a local area network ("LAN") and a wide area network ("WAN"), an inter-network such as the Internet, and/or a peer-to-peer network. The server system or apparatus 200 and the client devices 300, 300A may utilize various different computing model infrastructures, such as web services, distributed computing and grid computing infrastructures, for example and without limitation.

Referring to FIG. 2, the exemplary or representative server system (or apparatus) 200 comprises one or more processor circuit(s) 210 (also referred to equivalently as processor(s) 210), a network input/output ("I/O") interface circuit 215, and a memory circuit 205 (also referred to equivalently as a memory 205, such as a random access memory circuit (RAM) or the other forms of memory circuits 205 described below, such as DRAM, SDRAM, etc., which also may include one or more databases 220A), and may be coupled to one or more additional data storage devices 250 for database 220, 220B storage. Depending upon the selected embodiment, the server system or apparatus 200 may also include optional components discussed below with reference to client devices 300, 300A, such as user input devices, for example. The processor circuit(s) 210, network input/output ("I/O") interface circuit 215, memory circuit 205, and data storage device 250 having a database 220, 220B, may be implemented or embodied as known or becomes known in the electronic arts, with various examples described in greater detail below. In addition, multiple server systems (or apparatuses) 200 may be utilized in a search system 100, for example and without limitation.

FIG. 3 is a block diagram illustrating an exemplary or representative client device (or apparatus) 300, 300A. Referring to FIG. 3, the exemplary client device 300, 300A comprises one or more processor circuit(s) 305, a network input/output ("I/O") interface circuit 315, and a memory circuit 310 (such as a random access memory (RAM) or the other forms of memory circuits 310 described below, such as DRAM, SDRAM, etc., which also may include one or more databases). Depending upon the selected embodiment, the client device 300, 300A may also include optional components such as a user input/output ("I/O") interface circuit 320 (such as for coupling to a user input device 345 such as a keyboard, computer mouse, or other user input device, not separately illustrated), an audio input/output interface circuit 325 (e.g., for coupling to a microphone 355, to audio speakers or other audio player 330, such as for auditory output of results), a display input/output ("I/O") interface circuit (or display controller) 335, and may also include a display 340, such as an LED or LCD screen or mobile smartphone touch screen, such as for display of various graphical user interfaces. The processor circuit(s) 305, network input/output ("I/O") interface circuit 315, memory circuit 310, user input/output ("I/O") interface circuit 320, audio input/output interface circuit 325, audio player 330, display input/output ("I/O") interface circuit or controller 335, and display 340, may be implemented or embodied as known or becomes known in the electronic arts, with various examples described in greater detail below. In addition, multiple client devices 300, 300A may be utilized in a system 100, for example and without limitation. The processor circuit(s) 305 is or are structured, configured, adapted or otherwise programmed to process instructions, commands or other code within the system 100. In various embodiments, the processor circuit 305 is a single-threaded processor or may be a multi-threaded processor, and may have a single processing core or multiple processing cores (not separately illustrated). The processor circuit 305 is structured, configured, adapted or otherwise programmed generally to process instructions, commands or other code stored in the memory circuit 310 (or other memory and/or a storage device included with the client device 300, 300A) to display graphical information for a user interface.

Referring again to FIG. 2, in addition to other components, the processor circuit(s) 210 is or are structured, configured, adapted, or otherwise programmed to have or comprise a search engine 225. The search engine 225 of the processor circuit(s) 210 of the server system (or apparatus) 200 receives (via network I/O interface circuit 215) the server-side query signal transmitted from a client device 300, 300A via the network 110. The search engine 225 utilizes the information within the user query (as described in greater detail below) to generate and provide personalized search results, customized filtering, and personalized search result ranking, including relevant, higher-level categorization, classification or other grouping that corresponds to the content of the search query. The search engine 225 may comprise or otherwise be configured, adapted, structured or otherwise programmed to have one or more of the following subsystems or components, many of which are optional with inclusion depending upon the selected implementation, such as a secondary query generator 230, a vector generator 235, a category (classification) generator 240, an encoding generator (encoder) 255, a matrix generator 260, and optionally a filtering and ranking generator 245, which are adapted, configured or programmed to perform the personalized search, scoring, customized filtering, personalized ranking, and categorization (or classification) methodologies described in greater detail below. The search engine 225, and any or all of its subsystems or components, may also be distributed between and among the one or more processing cores 212 in a representative embodiment. The search engine 225, and any or all of its subsystems or components, may also be distributed between and among a plurality of server system(s) 200, in any suitable locations, such as distributed among multiple locations within a selected country or continent, for example and without limitation.

Figure 8:
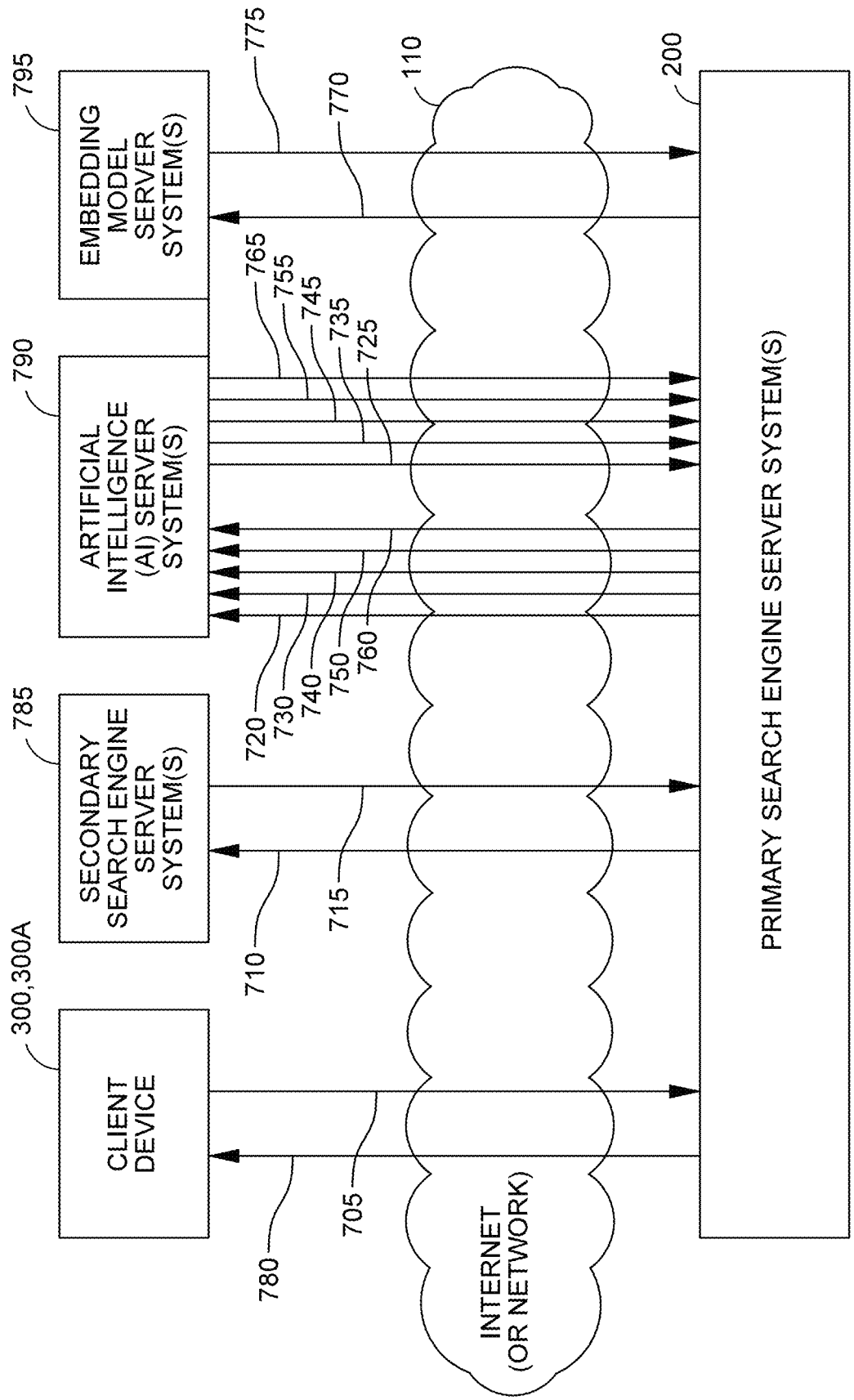
FIG. 8 is a block diagram illustrating exemplary or representative message transmission sequences for personalization of search results and search result ranking in a search engine.

As described in greater detail below, a user, using a client device 300, 300A and typically following a log in or user registration process, generates one or more initial queries 705 transmitted via the network 110 and received by the server system 200, as illustrated in FIG. 8. These one or more initial queries, generated by the user, are referred to herein as one or more "primary" queries 705. In a representative embodiment, the user may input the primary query or queries 705, and the search engine 225 (and more particularly the secondary query generator 230) will utilize the primary query 705, as discussed in greater detail below, generating and spawning one or more "secondary" queries (710, 720, 730, 740, 750, 760). These one or more primary queries 705 are then transmitted (via network 110) to the search engine 225. For example and without limitation, such a primary query 705 may be a business name, a chemical structure, a listing of medical symptoms, etc.

Also as described in greater detail below, instead of returning search results in response to the primary query 705, the secondary query generator 230 of the search engine 225 of the server system 200 generates and/or retrieves (from memory 205 and/or from database 220 stored in data storage device 250) and transmits (via network 110) one or more "secondary" queries 710, 720, 730, 740, 750, 760, to one or more other servers or networks, as discussed in greater detail below. The one or more secondary queries 710, 720, 730, 740, 750, 760 may be generated in a sequential or iterative process, using results received in response to prior secondary queries 710, 720, 730, 740, 750, 760 to generate new, additional secondary queries 710, 720, 730, 740, 750, 760, which also may be referred to equivalently as one or more tertiary, quaternary, etc. queries.

These secondary queries 710, 720, 730, 740, 750, 760 have at least one of several forms, and all are one or more series of questions pertaining to parameters, characteristics, or other information directly relevant to the primary query or queries 705, with various examples described below with reference to FIGS. 4-7. In a representative embodiment, the structure, format or form of the secondary queries 710, 720, 730, 740, 750, 760, or the secondary queries 710, 720, 730, 740, 750, 760 themselves, are stored and indexed in the memory circuit 205 and/or database 220 stored in data storage device 250, and as a result, the secondary query generator 230 may utilize the primary query or queries 705 or keywords of the primary query or queries 705 to access the memory circuit 205 and/or database 220 stored in data storage device 250 and generate or retrieve the secondary queries 710, 720, 730, 740, 750, 760 or structures or formats for the secondary queries 710, 720, 730, 740, 750, 760 corresponding to the primary query or queries 705 and/or its keywords. Such an index system in the memory circuit 205 and/or database 220 may have any number of forms and structures, as known or becomes known in the art, such as a series of database tables, look-up tables, etc.

In referring to the structure, format or form of the secondary queries 710, 720, 730, 740, 750, 760 stored and indexed in the memory 205 and/or database 220, it is anticipated that most (if not all) secondary queries 710, 720, 730, 740, 750, 760 will be different from each other, and will vary based upon the actual content of the primary query or queries 705 and the actual content selected from responses received by the search engine 225 to prior or earlier secondary queries 710, 720, 730, 740, 750, 760. It is anticipated, however, that various secondary queries 710, 720, 730, 740, 750, 760 will share a common structure or format having a placeholder, payload or "blank" to be filled in with the actual content of the particular primary query or queries 705 received by the search engine 225, while other various, follow up or subsequent secondary queries 710, 720, 730, 740, 750, 760 will also share a common structure or format, also having a placeholder, payload or "blank" to be filled in, but to be filled in with actual content selected from responses received by the search engine 225 to prior or earlier secondary queries 710, 720, 730, 740, 750, 760. In addition, it is anticipated that the various secondary queries 710, 720, 730, 740, 750, 760 are also likely to be transmitted to different entities or locations, and/or utilized to search within any of the various databases 220, 220A, 220B, for example and without limitation, depending upon the individual search to be performed. In addition, the data contained in the secondary query responses (715, 725, 735, 745, 755, 765) (i.e., responses (715, 725, 735, 745, 755, 765) to the one or more secondary queries 710, 720, 730, 740, 750, 760, respectively) will generally vary, and may be extracted and/or transformed as or to be the data or content of corresponding "text variables", i.e., text variables are populated with data received in corresponding secondary query responses (715, 725, 735, 745, 755, 765), as discussed in greater detail below. Various examples of such secondary queries 710, 720, 730, 740, 750, 760 are discussed in greater detail below with reference to FIGS. 4-7.

Figure 4B:
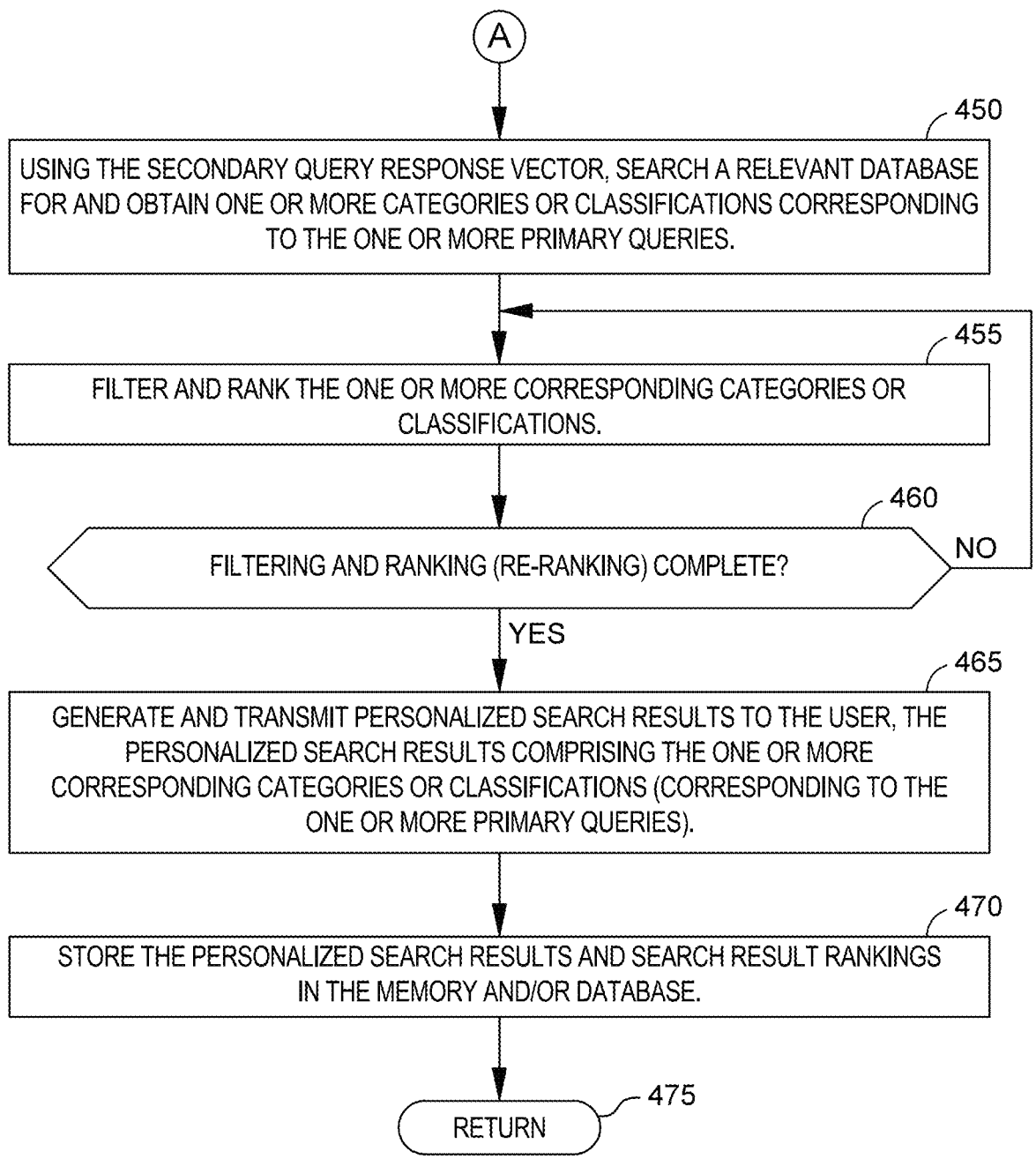
Figure 5B:
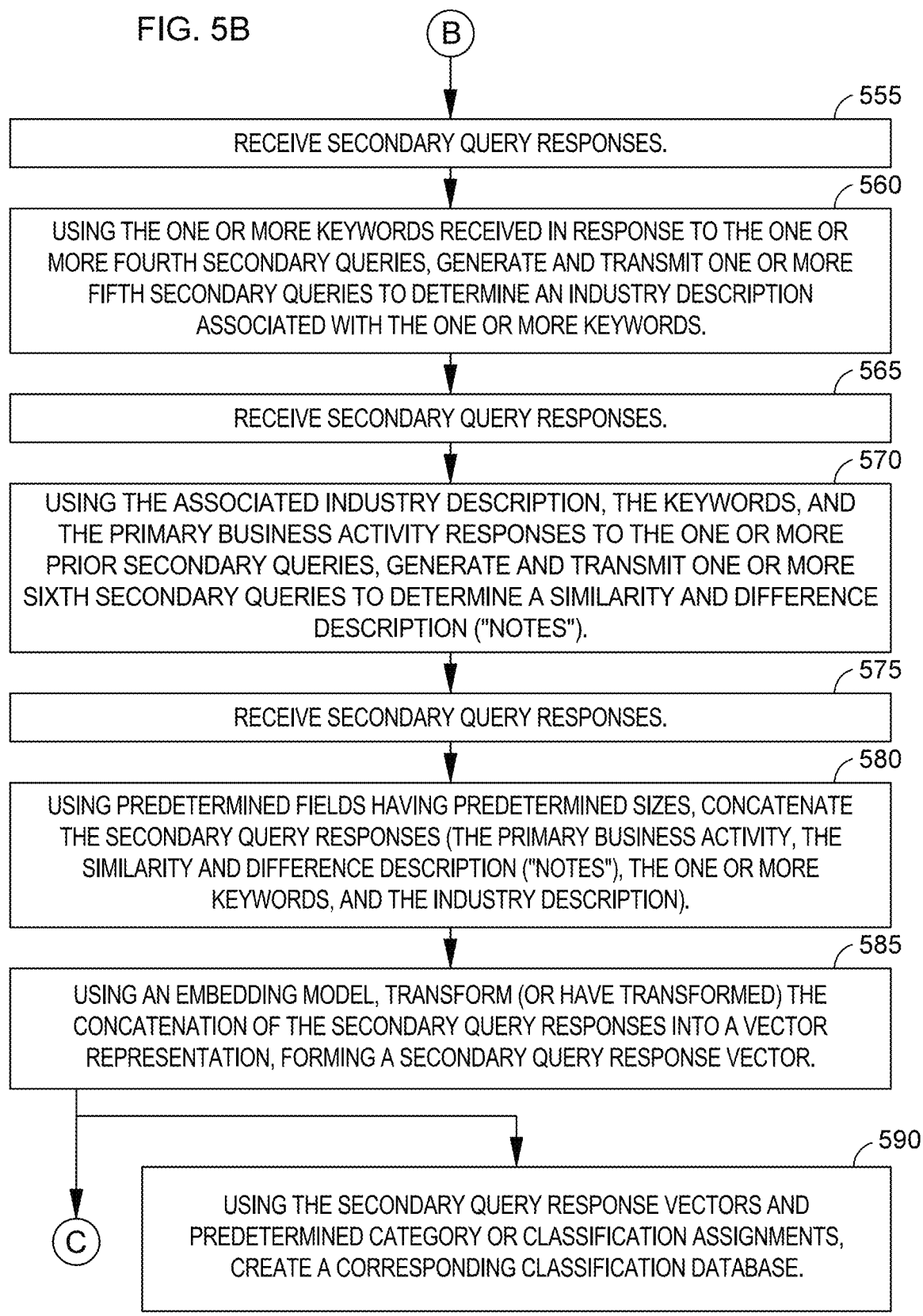
Figure 5C:
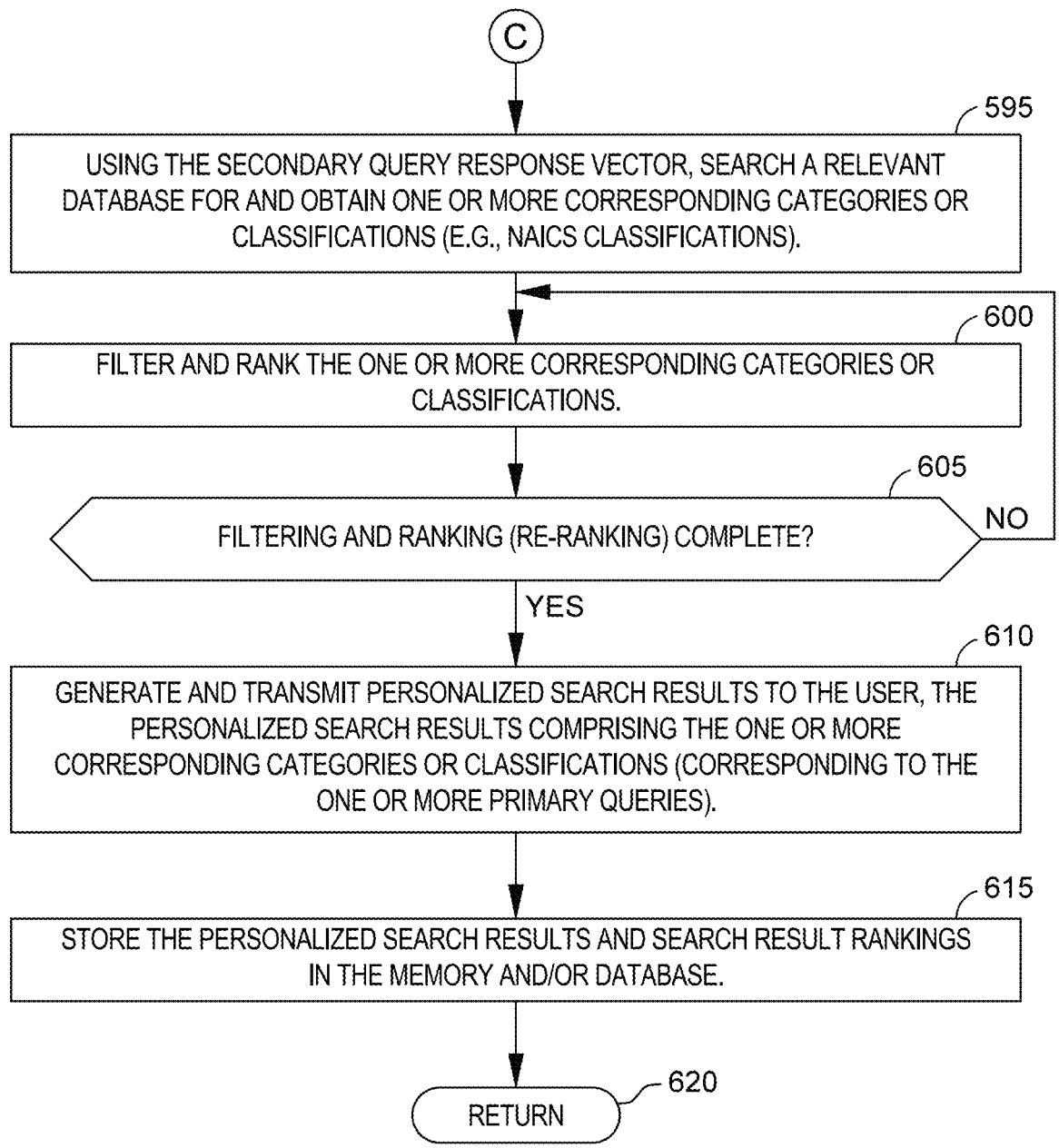

FIG. 4 is a flow diagram illustrating an exemplary or representative first method 400 embodiment for personalization of search results and search result ranking in a search engine. FIG. 5 is a flow diagram illustrating an exemplary or representative second method 500 embodiment for personalization of search results and search result ranking in a search engine, more specifically applying the first method 400 to generate search results which include business categorizations or classifications, as a more specific example of an implementation of the exemplary or representative first method embodiment for personalization of search results and search result ranking in a search engine.

Figure 6B:
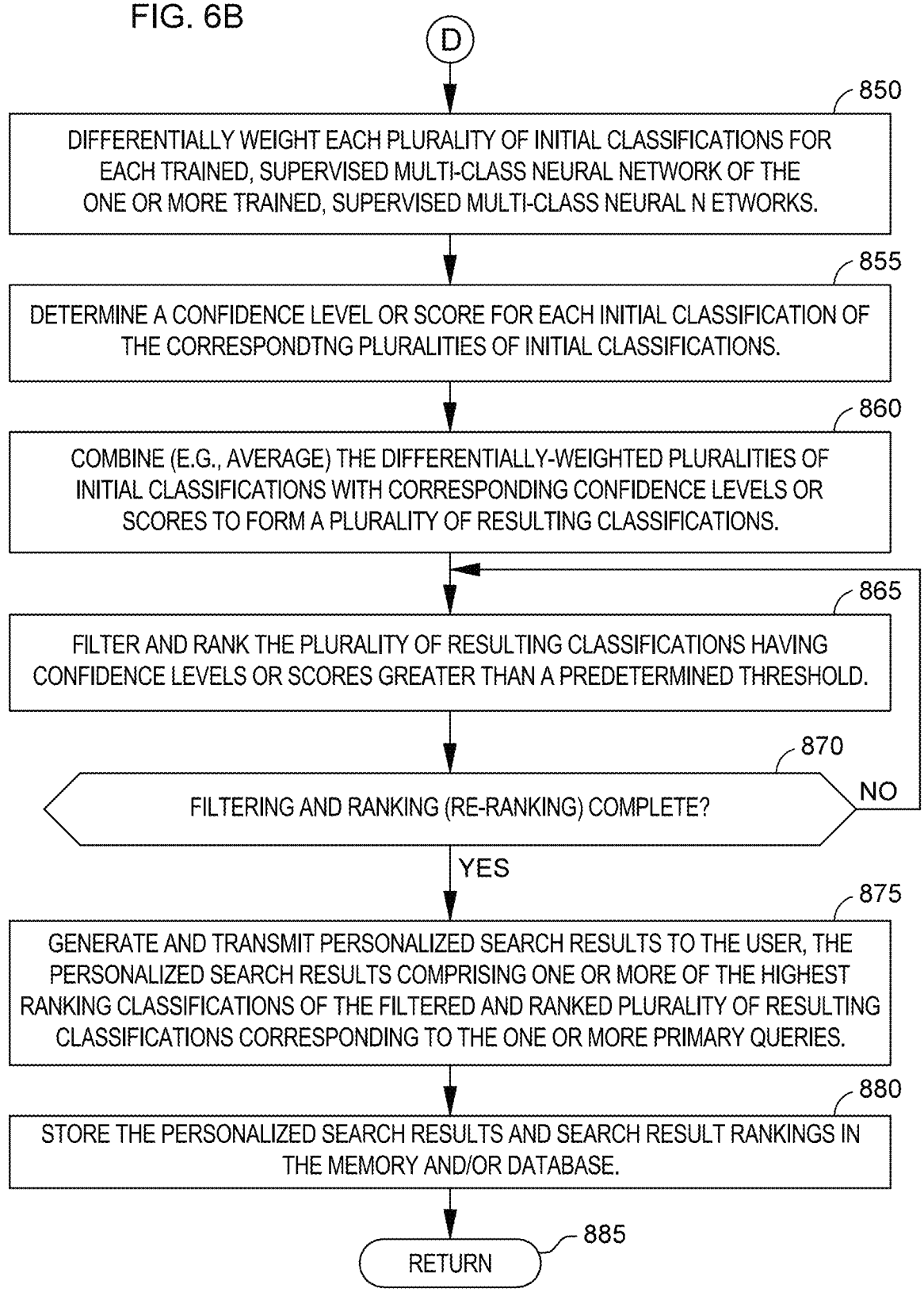

FIG. 6 is a flow diagram illustrating an exemplary or representative third method 800 embodiment for personalization of search results and search result ranking in a search engine. FIG. 7 is a flow diagram illustrating an exemplary or representative fourth method 900 embodiment for personalization of search results and search result ranking in a search engine, more specifically applying the third method 800 to generate search results which include business categorizations or classifications.

FIG. 8 is a block diagram illustrating exemplary or representative message transmission sequences for primary queries 705, secondary queries 710, 720, 730, 740, 750, 760, secondary query responses (715, 725, 735, 745, 755, 765) (i.e., responses (715, 725, 735, 745, 755, 765) to the one or more secondary queries 710, 720, 730, 740, 750, 760, respectively), vector embedding messages 770, response vector messages 775, and search result transmission (780) for personalization of search results and search result ranking in a search engine 225.

Referring to FIG. 4 and the other Figures, an exemplary or representative first method 400 embodiment for personalization of search results and search result ranking in a search engine 225 begins, start step 405, with a reception of one or more primary queries 705 by the search engine 225, step 410. Using the one or more primary queries, the secondary query generator 230 of the search engine 225 generates and transmits one or more secondary queries 710, 720, 730, 740, 750, 760, step 415, and one or more responses (715, 725, 735, 745, 755, 765) to the one or more secondary queries 710, 720, 730, 740, 750, 760 are received by the search engine 225, step 420. Using the one or more responses (715, 725, 735, 745, 755, 765) received to the secondary queries (or additional secondary queries), in step 425, the search engine 225 determines whether are any further or additional secondary queries necessary or desirable. When further or additional secondary queries are necessary or desirable in step 425, the first method proceeds to step 430, with the secondary query generator 230 generating and transmitting additional or further secondary queries 710, 720, 730, 740, 750, 760 and iterates, returning to step 425 until no further or additional secondary queries are necessary or desirable. As discussed in greater detail below, the one or more primary queries 705 and the one or more secondary queries 710, 720, 730, 740, 750, 760 pertain to determining functionality, such as determining what something does, its functions, and its sub-functions.

When no further or additional secondary queries 710, 720, 730, 740, 750, 760 are necessary or desirable in step 425, using predetermined fields having predetermined sizes (lengths), the responses received to the secondary queries (secondary query responses (715, 725, 735, 745, 755, 765) are concatenated by the vector generator 235 of the search engine 225, step 435, to form a response concatenation. The response concatenation of the plurality of the secondary query responses 715, 725, 735, 745, 755, 765 will generally have the form of [secondary query response 715‖secondary query response 725‖secondary query response 735‖secondary query response 745‖secondary query response 755‖secondary query response 765], for as many selected secondary query responses 715, 725, 735, 745, 755, 765 that may be utilized, as necessary or desirable, for example and without limitation, with an example described below with reference to FIG. 5, with "‖" being a concatenation operator.

Using an embedding model (such as provided by an embedding model server 795 or otherwise provided within the search engine 225), the vector generator 235 then transforms (or has transformed or generated) the response concatenation into a vector representation, as a series of numbers forming a secondary query response vector, also referred to as a "search vector", step 440. For example and without limitation, in a representative embodiment, the search vector is an 8192-dimensional vector, or a 1536-dimensional vector using an embedding model such as "text-embedding-ada-002" or another Open AI embedding model. Also for example and without limitation, in a representative embodiment, the vector generator 235 generates and transmits (as vector embedding message 770) the concatenation of secondary query responses (715, 725, 735, 745, 755, 765) to the embedding model server 795, which in turn generates and provides (as response vector message 775) the vector representation of the concatenation of secondary query responses (715, 725, 735, 745, 755, 765) to form the search vector (secondary query response vector). By using predetermined fields having predetermined sizes (lengths) for the response concatenations, all of the concatenations of secondary query responses (715, 725, 735, 745, 755, 765) will be commensurate in size with each other (i.e., will have the same size or dimension), resulting in all of the search vectors (secondary query response vectors) also being commensurate in size with each other (i.e., will have the same size or dimension), for subsequent direct comparison using the vector representations. Those having skill in the art will recognize that there are other methods for combining responses, in addition to or in lieu of concatenation, including vector representations of the responses, such as summing, averaging, and so on, for example and without limitation. In addition, each of the secondary query responses may be separately transformed into a vector representation, and in turn, each of those vectors may be concatenated, summed, averaged, etc., for example and without limitation, and any and all such variations are within the scope of the disclosure. Each of these different methods of combining will also be pertinent to database searching as well, such as searching a vector database populated with vectors formed using the same or similar method of combination, e.g., concatenation, summing, averaging of vectors, and so on, also for example and without limitation.

It should be noted that, as an option, a classification database 220 may be created (step 445), if needed, following step 440. When a classification database may be necessary or desirable, the steps 405-440 may be performed using predetermined primary queries having assigned or known categories or classifications. This results in the creation of vector representations of the response concatenations of the responses to the secondary queries (secondary query response vectors) which have corresponding, assigned or known categories or classifications, such as from historical data, which may then be utilized to populate the classification database 220, optional step 445. It should also be noted that such a classification database 220 may then also be used as a training classification database 220B, for example and without limitation, such as for refining the first method 400. In addition, such a training classification database 220B may also be populated with historical data, as discussed in greater detail below. Also in addition, such a training classification database 220B may also be populated with "balanced" data, such as supplementing historical data (e.g., pertaining to business classifications) with additional data to equalize representation in the training classification database 220B for the otherwise underrepresented entities (e.g., supplementing or adding information into the training classification database 220B, such as including types or examples of businesses or business classifications which would otherwise be not included in such a training classification database 220B).

Following step 440, using the search vector (i.e., the secondary query response vector), the category (classification) generator 240 then searches a relevant database, such as the classification database 220, for categories or classifications and obtains one or more categories or classifications, step 450, which then will be used to form the search results. It should be noted that these categories or classifications correspond to the one or more primary queries, through the amplification of detail provided by the responses to the secondary queries.

The one or more categories or classifications resulting from the vector search of the database 220 may then be filtered and ranked (scored) for accuracy, using the filtering and ranking generator 245, step 455, such as based upon a goodness of fit or a distance determination from direct comparison of the secondary query response vectors. As mentioned above, by using predetermined fields having predetermined sizes (lengths) for the response concatenations, all of the concatenations of secondary query responses are commensurate in size with each other (i.e., will have the same size or dimension), resulting in search vectors (secondary query response vectors) also having the same dimensionality, allowing direct comparisons of the secondary query response vectors. When the filtering and ranking is complete, step 460, the search engine 225 generates and transmits personalized search results to the user (personalized search results transmission 780), with the personalized search results comprising the one or more corresponding categories or classifications, i.e., one or more categories or classifications corresponding to the one or more primary queries, step 465. The personalized search results and search result rankings are also stored by the search engine 225 in the memory 205 and/or database 220, step 470, and the first method may end, return step 475.

As mentioned above, an exemplary or representative second method 500 embodiment for personalization of search results and search result ranking in a search engine is illustrated in FIG. 5, more specifically applied to generating search results which includes business categorizations or classifications. As discussed in greater detail below, many of the secondary queries 720, 730, 740, 750, 760 may be generated and transmitted to an artificial intelligence ("AI") server 790, such as a Generative Pre-trained Transformer 4 (GPT-4) server, a ChatGPT server, or a ChatGPT Plus server, for example and without limitation. The exemplary or representative second method 500 embodiment employs Retrieval Augmented Generation ("RAG"), for example and without limitation, to provide specific parameters for (prompt engineering or "guardrails") and otherwise restrict the nature and content of the information to be retrieved and/or searched, avoiding the potential problem of an AI server 790 (such as GPT-4) from "hallucinating" or otherwise generating or retrieving incorrect or misleading information. Other equivalent methods may employ, also for example and without limitation, various machine learning models, large language models, or other supervised models trained using historical data or otherwise known answers or responses, The exemplary or representative second method 500 embodiment may also be implemented using or otherwise employ one or more agents, such as a Modular Reasoning, Knowledge and Language ("MRKL") system agent, also for example and without limitation. It should also be noted that the steps of the exemplary or representative second method 500 embodiment may be performed in a wide variety of orders, and all such variations are considered equivalent and within the scope of the disclosure.

Referring to FIG. 5, and the other Figures, an exemplary or representative second method 500 embodiment for personalization of search results and search result ranking in a search engine 225 begins, start step 505, with a reception of one or more primary queries 705 by the search engine 225, step 510. For example and without limitation, in a representative embodiment, a primary query 705 may be a company name or a personal name, such as the name of a company or person applying for financing, also for example and without limitation. Using the one or more primary queries 705, the secondary query generator 230 of the search engine 225 generates and transmits one or more first secondary queries 710, with the one or more first secondary queries pertaining to a real time web presence from primary and secondary sources, for example, step 515, and one or more responses to the one or more first secondary queries are received by the search engine 225, step 520 (secondary query response(s) 715). For example and without limitation, in a representative embodiment, the one or more first secondary queries 710 may be transmitted to secondary (or third-party) search engines 785, such as Google or Microsoft Bing, to determine the web presence of the company named in the primary query 705, and may also include secondary queries 710 to perform a web crawl (or web scraping), such as a web crawl of the website of the company, person, or other entity named in the primary query 705. For example and without limitation, such a web crawl or web scraping may include reading in or extracting the data and information from a main web page or tab and an about us page or tab, and typically may also exclude the sides or side panels and footers of the various web pages.

As mentioned above, many of the secondary queries 710, 720, 730, 740, 750, 760 stored and indexed in the memory 205 and/or database 220 share a common structure, format or form, and will vary based upon the actual content of the primary query or queries 705 or based upon actual content selected from responses received by the search engine 225 to prior or earlier secondary queries 710, 720, 730, 740, 750, 760. In addition, it is anticipated that the various secondary queries 710, 720, 730, 740, 750, 760 are also likely to be transmitted to different entities or locations, and/or utilized to search within any of the various databases 220, 220A, 220B, for example and without limitation, depending upon the individual search to be performed. In this instance, for the first secondary queries 710, the first secondary queries 710 will have a common structure, format or form, and will vary based upon their payload, i.e., based upon the actual content of the primary query or queries 705 received by the search engine 225, and may also vary based upon the destination for transmission, such as to a secondary (or third-party) search engines 785, such as Google or Microsoft Bing. In addition, the data contained in the secondary query responses (715, 725, 735, 745, 755, 765) will generally vary, and may be extracted and/or transformed as or to be the data or content of corresponding "text variables", i.e., text variables may be populated with data received in corresponding secondary query responses (715, 725, 735, 745, 755, 765), as discussed in greater detail below.

Using responses (715) received to the one or more first secondary queries (710), the search engine 225 generates an initial "context" associated with the one or more primary queries 705, step 525, with such an initial context comprising, for example and without limitation, a collection of descriptors (or descriptions), descriptive words and keywords obtained by the Internet search and web crawl, and so on. For example and without limitation, for a restaurant, such an initial context may include a set or collection of descriptors or keywords such as {restaurant, Italian, marinara, pizza, Bolognese, caprese, banquet, . . . }, and so on. Such an initial context which is generated by the search engine 225 may also be considered to be or function as a text variable, populated with or extracting the set or collection of descriptors or keywords described above. As such an initial context may not and probably does not have any significant organization or coherency, in step 530, the secondary query generator 230 of the search engine 225 generates and transmits one or more second secondary queries (secondary queries 720) to create an initial, summary description using the initial context, corresponding to the one or more primary queries, and one or more responses (725) to the one or more second secondary queries are received by the search engine 225, step 535 (secondary query response(s) 725).

In a representative embodiment, for example and without limitation, the one or more second secondary queries 720 may comprise a query or prompt to an AI server 790, which includes the initial context, and further directs or requests that the AI server 790, using or otherwise based upon the provided initial context, generate a summary description. In a representative embodiment, for example and without limitation, the AI server 790 may be a Generative Pre-trained Transformer 4 (GPT-4) server, ChatGPT, or ChatGPT Plus, and the one or more second secondary queries 720 may include the initial context with a prompt, directive, or system message to create an "about us" description or summary. As a first example, a secondary query response 725 having a summary or "about us" description may be: "XXX Electric is your trusted electrician in YYY and the surrounding areas. At XXX Electric, we are committed to providing quality, efficient, and reliable electrical services to both residential and commercial clients. With years of experience in the industry, our team of highly-trained electricians specializes in a wide range of services, from installing security lighting for your outdoors to setting up a whole home generator that ensures uninterrupted power during outages. Our comprehensive design and installation services cover everything from air conditioning units tailored specifically to meet your cooling requirements at home or office spaces to advanced monitoring systems allowing you complete visibility over events happening within your property." As another, second example, a secondary query response 725 having a summary or "about us" description may be: "WWW is a provider of home care services in ZZZ and the surrounding areas. With a commitment to going above and beyond for each individual we serve, our mission is to provide personalized care that enhances the health and well-being of every client. We understand that your home is where you feel most comfortable and safe, which is why we bring the convenience and comfort of facility-based care directly to you. Whether you need assistance with daily activities such as personal care or light housekeeping, respite care for temporary relief for caregivers, or initial on-site assessments or periodic assessments to ensure quality care are being provided, our experienced team strives to meet all your needs." Such a "summary description" or "about us description" may also be considered to be or function as a text variable, populated with or extracting the data of or from the "about us" description or summary described above, for example and without limitation.

As mentioned above, many of the secondary queries 720 stored and indexed in the memory circuit 205 and/or database 220 share a common structure, format or form, and will vary based upon their payload, such as the actual content selected from responses received by the search engine 225 to prior or earlier secondary queries 710, e.g., will vary based upon the collection of descriptors (or descriptions), descriptive words and keywords obtained by the Internet search and web crawl forming the initial context. In addition, in this representative instance, the secondary query 720 is transmitted to a different entity or location, such as to the AI server 790, for example and without limitation. In this instance, the second secondary queries 720 have a common structure, format or form, and will vary based upon their payload, i.e., based upon the actual content of the initial context generated by the search engine 225, and may also vary based upon the destination for transmission, such as to an AI server 790, such as GPT-4 or ChatGPT, for example and without limitation. The other secondary queries 730, 740, 750, 760, discussed below, will also vary based upon their respective payloads, i.e., based upon the responses (725, 735, 745, 755, 765) received to the prior secondary queries 720, 730, 740, 750, 760. As discussed above, the one or more primary queries 705 and the one or more secondary queries 710, 720, 730, 740, 750, 760 generally pertain to determining functionality, such as determining what something or some person does, its or their functions, and its or their sub-functions, such as what is a company's or person's primary activity, what does the company or person do, what functions does the company or person perform, etc., for example and without limitation.

In step 540, the secondary query generator 230 of the search engine 225 generates and transmits one or more third secondary queries (third secondary queries 730) to the AI server 790 to determine a primary activity, such as a primary business activity, using the summary description, thereby also corresponding to the one or more primary queries, and one or more responses (735) to the one or more third secondary queries are received by the search engine 225, step 545 (secondary query response(s) 735). In a representative embodiment, for example and without limitation, the one or more third secondary queries 730 may comprise a query or prompt to the AI server 790, which includes the summary description, and further directs or requests that the AI server 790, using or otherwise based upon the provided summary description, determine and generate a description of a primary activity. Continuing with the examples, for the first example, the secondary query response 735 would designate that the primary activity is electrical services, while for the second example, the secondary query response 735 would designate that the primary activity is home care services, also for example and without limitation. It should be noted that depending upon the primary query, the primary activity may be an activity other than a primary business activity, such as a primary sports activity, a primary educational activity, a primary travel activity, a primary cultural activity, a primary athletic activity, a primary leisure activity, etc., for example and without limitation Such a "primary activity" may also be considered to be or function as a text variable, populated with or extracting the data or descriptions as described above, such as populated with "electrical services" or "home care services".

In step 550, the secondary query generator 230 of the search engine 225 generates and transmits one or more fourth secondary queries (fourth secondary queries 740) to the AI server 790 to determine one or more keywords using the designated primary activity, thereby also corresponding to the one or more primary queries, and one or more responses (745) to the one or more fourth secondary queries are received by the search engine 225, step 555 (secondary query response(s) 745). In a representative embodiment, for example and without limitation, the one or more fourth secondary queries 740 may comprise a query or prompt to the AI server 790, which includes the designation of the primary activity, and further directs or requests that the AI server 790, using or otherwise based upon the primary activity, determine and generate one or more keywords associated with or corresponding to the primary activity. In a representative embodiment, for example and without limitation, the one or more fourth secondary queries 740 may direct or request that the AI server 790 determine and generate a predetermined number of search engine optimization ("SEO") keywords associated with or corresponding to the primary activity, such as the primary business activity. Continuing with the examples, for the first example, the secondary query response 745 would designate that the keywords for electrical services would include "electrician", "electrical installation", "wiring", "licensed", etc., while for the second example, the secondary query response 735 would designate that the keywords for home care services would include "in-home care", "personal care", "personal care assistance", "aging-in-place", etc., also for example and without limitation. Such a set of keywords which is generated by the AI server 790 and/or search engine 225 may also be considered to be or function as a text variable, populated with or extracting the set or collection of keywords (e.g., SEO keywords) described above.

In step 560, the secondary query generator 230 of the search engine 225 generates and transmits one or more fifth secondary queries (fifth secondary queries 750) to the AI server 790 to determine an industry description associated with or otherwise using the one or more keywords, thereby also corresponding to the one or more primary queries, and one or more responses (755) to the one or more fifth secondary queries are received by the search engine 225, step 565 (secondary query response(s) 755). In a representative embodiment, for example and without limitation, the one or more fifth secondary queries 750 may comprise a query or prompt to the AI server 790, which includes the designation or listing of the one or more keywords, and further directs or requests that the AI server 790, using or otherwise based upon the one or more keywords, determine and generate an industry description associated with or corresponding to the one or more keywords. As a third example, also without limitation, for civil engineering services, the keywords might include "construction of highways, dams, water lines, sewer lines, oil and gas pipeline and related structures, street and bridge construction, excavation, demolition, site development, etc.", and the secondary query response 755 would designate that the industry description for such keywords would include: "The heavy and civil engineering construction industry plays a pivotal role in the infrastructure development and maintenance of a nation, undertaking the construction of entire engineering projects such as highways, dams, bridges, streets, and essential utility systems. It encompasses a wide range of activities including water and sewer line construction, oil and gas pipeline and related structures construction, power and communication line and related structures construction, all of which require expert excavation techniques, grading, and, when necessary, demolition of buildings and other structures. These projects are complex, often demanding a thorough understanding of architectural design, structural engineering, site development, and the utilization of a myriad of construction materials. Furthermore, this sector must navigate a labyrinth of regulations and requirements, from adherence to building codes and zoning regulations to the procurement of construction permits, ensuring all projects are executed safely, responsibly, and sustainably.". Such an industry description which is generated by the AI server 790 and/or search engine 225 may also be considered to be or function as a text variable, populated with or extracting one or more paragraphs of such data, as described above, also for example and without limitation.

In step 570, the secondary query generator 230 of the search engine 225 generates and transmits one or more sixth secondary queries (sixth secondary queries 760) to the AI server 790 to determine a similarity and difference description (referred to herein as "notes") associated with or otherwise using the associated industry description, the keywords, and the primary activity, thereby also corresponding to the one or more primary queries, and one or more responses (765) to the one or more sixth secondary queries are received by the search engine 225, step 575 (secondary query response(s) 765). In a representative embodiment, for example and without limitation, the one or more sixth secondary queries 760 may comprise a query or prompt to the AI server 790, which includes the designation or listing of the associated industry description, the keywords, and the primary activity, and further directs or requests that the AI server 790, using or otherwise based upon the associated industry description, the keywords, and the primary activity, determine and generate a similarity and difference description. In a representative embodiment, for example and without limitation, one of the sixth secondary queries 760 may comprise a query or prompt to the AI server 790 which directs or requests that the AI server 790, using or otherwise based upon the associated industry description, the keywords, and the primary activity, determine and generate a similarity description, such as a description of similar industries; and another one of the sixth secondary queries 760 may comprise a query or prompt to the AI server 790 which directs or requests that the AI server 790, using or otherwise based upon the associated industry description, the keywords, and the primary activity, determine and generate a difference description, such as a description of how the company of the primary query is different from these similar industries. Continuing with the third example, also without limitation, for the civil engineering services, and the keywords and industry description described above, the similarity and difference description ("notes") would include: "Large scale construction and public engineering projects, usually related to government sponsoring the development of structures that serve the public, not any one individual or private company. These companies will often have many subcontractors and work on projects worth millions or hundreds of millions of dollars. Usually will have much heavier equipment and will involve large quantities of raw materials and labor for longer periods of time.". Such a similarity and difference description ("notes") which is generated by the AI server 790 and/or search engine 225 may also be considered to be or function as a text variable, populated with or extracting one or more paragraphs of such data, as described above, also for example and without limitation.

In step 580, using predetermined fields having predetermined sizes (lengths), one or more selected secondary query responses 735, 745, 755, 765 (the primary activity, the one or more keywords, the industry description, and the similarity and difference description(s) ("notes")) are concatenated by the vector generator 235 of the search engine 225 to form the response concatenation, or are otherwise combined as discussed above. The concatenation of the selected secondary query responses 735, 745, 755, 765 will generally have the form of [primary activity||one or more keywords-||industry description||similarity and difference description(s) ("notes")]. The concatenation of the selected secondary query responses 735, 745, 755, 765 may also be considered to generally have the form of [first text variable||second text variable||third text variable||fourth text variable], for example and without limitation. Those having skill in the art will recognize that such concatenations may be in any order (used consistently), and other methods of combining are also within the scope of the disclosure, as discussed above. Using an embedding model (such as provided by an embedding model server 795), the vector generator 235 then transforms (or has transformed or generated) the concatenation of secondary query responses 735, 745, 755, 765 into a vector representation, as a series of numbers forming the secondary query response vector, step 585. For example and without limitation, in a representative embodiment, the vector representation is an 8192-dimensional vector, or a 1536-dimensional vector using an embedding model such as "text-embedding-ada-002" or another Open AI embedding model. Also for example and without limitation, in a representative embodiment, the vector generator 235 generates and transmits (vector embedding message 770) the concatenation of secondary query responses (735, 745, 755, 765) to the embedding model server 795, which in turn generates and provides the vector representation of the concatenation of secondary query responses (735, 745, 755, 765) to form the secondary query response vector (search vector, contained within or otherwise included in response vector message 775). Alternatively, the secondary query response vector may be created by the search engine 225 and/or processor circuit(s) 210. By using predetermined fields having predetermined sizes (lengths) for the response concatenations, all of the concatenations of secondary query responses (735,

745, 755, 765) will be commensurate in size with each other (i.e., will have the same size or dimension), resulting in all of the secondary query response vectors also being commensurate in size with each other (i.e., will have the same size or dimension), for subsequent direct comparison in a vector representation.

Similarly to the plurality of secondary queries 710, 720, 730, 740, 750, 760, the structure, format or form of the vector embedding messages 770 may also be stored and indexed in the memory 205 and/or database 220. The vector embedding messages 770 share a common structure, format or form, and will also have a payload, placeholder or "blank" to be filled in based upon the actual content from responses to prior or earlier secondary queries 710, 720, 730, 740, 750, 760, and may also vary based upon the destination for transmission. The vector embedding messages 770 vary based upon their payload, in this instance, based upon the actual response concatenation to be transformed into a vector representation. In addition, in this representative instance, the vector embedding message 770 may be transmitted to a different entity or location, such as to the embedding model server 795, for example and without limitation.

It should be noted that a classification database 220 may be created, if needed, following step 585, as an option. When a classification database may be necessary or desirable, the steps 505-585 may be performed using predetermined primary queries having assigned or known categories or classifications. This results in the creation of vector representations of concatenations of the responses to the secondary queries search vectors (secondary query response vectors) which have corresponding, assigned or known categories or classifications, which may then be utilized to populate the classification database 220, optional step 590. It should also be noted that such as classification database 220 may then also be used as a training classification database 220B, for example and without limitation, and may also be provided with balanced data, such as for refining the second method 500.

Following step 585 (or 590), using the search vector (secondary query response vector), the category (classification) generator 240 then searches a relevant database, such as the classification database 220, for categories or classifications and obtains one or more categories or classifications, step 595, which then will be used to form the search results. It should be noted that these categories or classifications also correspond to the one or more primary queries, through the amplification of detail provided by the responses to the secondary queries. It should also be noted that in addition to or in lieu of a vector search, the search step 595 (and search step 450) may implement other or additional forms of searching, including a more limited or sparse search (e.g., searching just the keyword portion of the secondary query response vector), or a hybrid search (e.g., searching one or more portions of or with the secondary query response vector together with other personalized search terms).

The one or more categories or classifications resulting from the vector search of the database 220 may then be filtered and ranked (or scored) for accuracy, using the filtering and ranking generator 245, step 600, such as based upon a goodness of fit, a distance determination from direct comparison of the secondary query response vectors, a "truth-score" from a supervised model, a confidence level, etc., for example and without limitation. As mentioned above, by using predetermined fields having predetermined sizes (lengths) for the concatenations, all of the concatenations of secondary query responses are commensurate in size with each other (i.e., will have the same size or dimension), resulting in search vectors (secondary query response vectors) also having the same dimensionality, allowing direct comparisons of the search vectors (secondary query response vectors). When the filtering and ranking (or re-ranking) is complete, step 605, the search engine 225 generates and transmits personalized search results to the user (personalized search results transmission 780), with the personalized search results comprising the one or more corresponding categories or classifications corresponding to the one or more primary queries, step 610. The personalized search results and search result rankings are also stored by the search engine 225 in the memory 205 and/or database 220, step 615, and the second method may end, return step 620.

The filtering and ranking (and/or re-ranking) of the categories or classifications resulting from the vector search of the database 220, of steps 455, 460 and 600, 605 can be performed in a wide variety of ways, any and all of which are considered equivalent and within the scope of the disclosure. In a representative embodiment, for example and without limitation, the filtering and ranking generator 245 generates and transmits a seventh secondary query to the AI server 790 which directs or requests that the AI server 790 perform a similarity comparison of: (1) each description associated with or corresponding to each of the categories or classifications resulting from the vector search of the database 220; with (2) the industry description (obtained in steps 560, 565). From the results of such a similarity comparison, within a predetermined threshold, categories or classifications resulting from the vector search of the database 220 may be retained in the final search results or eliminated from the final search results.

In another representative embodiment, for example and without limitation, the filtering and ranking generator 245 filters and ranks the one or more associated classifications or categories using a vector distance determination, and selects one or more associated classifications or categories from the one or more associated classifications or categories having the comparatively closest or smallest vector distances. In another representative embodiment, for example and without limitation, the filtering and ranking generator 245 filters and ranks the one or more associated classifications or categories using a vector goodness of fit determination, and selects one or more associated classifications or categories from the one or more associated classifications or categories having the comparatively highest or greatest goodness of fit. In a representative embodiment, for example and without limitation, a predetermined number of associated classifications or categories are selected, having comparatively closer or smaller vector distances or comparatively higher or greater goodness of fit. As mentioned above, other ranking and scoring methods are considered equivalent and within the scope of the disclosure, such as truth-scoring, confidence levels, etc., for example and without limitation.

In another representative embodiment, also for example and without limitation, the database 220 and/or training classification database 220B, in steps 445 and/or 590, have been populated with historical data having predetermined or otherwise known or assigned categories or classifications, including all of the corresponding or associated summary or "about us" descriptions, industry descriptions, one or more keywords, primary activities, and similarity and difference description(s) ("notes"). The filtering and ranking generator 245 can then be trained (e.g., in context learning) for accuracy using the database 220 and/or training classification database 220B, to select the closest, most similar categories or classifications, also within a predetermined threshold.

The representative third and fourth method embodiments, as described in greater detail below, providing a unique combination or melding of generative AI with machine learning, such as by using trained, supervised multi-class neural networks. As used herein, a "supervised" neural network refers to use of labeled data sets to train a neural network to classify data or predict outcomes accurately, such that the neural network is trained using a training dataset having input-output pairs, i.e., each input has a known, correct answer. Also as used herein, a "multi-class" neural networks refers to a machine learning model that can predict a target with multiple possible values, i.e., the neural network can select from multiple, discrete possibilities and/or predict multiple values (e.g., determining whether the photograph of a dog illustrates a beagle, a terrier, or a poodle, for example and without limitation).

Referring to FIG. 6 and the other Figures, an exemplary or representative third method 800 embodiment has considerable overlap with the first and second method embodiments previously described, and those having skill in the art will recognize that much of the previous description is equally applicable to the third method 800 embodiment. In the interests of brevity, much of the previous description will not be duplicated. Referring to FIG. 6, the exemplary or representative third method 800 embodiment for personalization of search results and search result ranking in a search engine 225 begins, start step 805, with a reception of one or more primary queries 705 by the search engine 225, step 810. Using the one or more primary queries, the secondary query generator 230 of the search engine 225 generates and transmits one or more secondary queries 710, 720, 730, 740, 750, step 815, and one or more responses (715, 725, 735, 745, 755) to the one or more secondary queries 710, 720, 730, 740, 750 are received by the search engine 225, step 820. Using the one or more responses (715, 725, 735, 745, 755) received to the secondary queries (or additional secondary queries), in step 825, the search engine 225 determines whether are any further or additional secondary queries necessary or desirable. When further or additional secondary queries are necessary or desirable in step 825, the third method proceeds to step 830, with the secondary query generator 230 generating and transmitting additional or further secondary queries 710, 720, 730, 740, 750 and iterates, returning to step 825 until no further or additional secondary queries are necessary or desirable. As previously described, the one or more primary queries 705 and the one or more secondary queries 710, 720, 730, 740, 750 may pertain to determining functionality, such as determining what something or someone does, its or their functions, and its or their sub-functions.

When no further or additional secondary queries 710, 720, 730, 740, 750 are necessary or desirable in step 825, optionally using predetermined ordering, the search engine 225 extracts, selects, combines and/or transforms the responses (715, 725, 735, 745, 755) received to the secondary queries into a corresponding plurality of text variables, step 835. For example and without limitation, the data received in one or more of the secondary query responses (715, 725, 735, 745, 755) may be received as one or more JSON file types or data structures (.json or JavaScript Object Notation) and extracted and/or transformed into a corresponding text variable having another file type or data structure, such as a text variable having data structured or provided using comma separate values (.csv). A predetermined ordering, e.g., the concatenation described previously, and/or predetermined sizing may be utilized (as an option) so that each set of text variables may be compared or be commensurate with another set of text variables. As part of the third method 800, one or more supervised multi-class neural networks are trained using balanced data, step 840, such as using the balanced training data described above, such as a historical, accurate and labelled dataset typically supplemented by additional or third party data to provide greater coverage or depth, such as greater representation across multiple fields or industries, also for example and without limitation. This training step 840 may be performed initially, and once the supervised multi-class neural networks are trained to a selected or desired level of accuracy or confidence, the training step 840 may be omitted subsequently.

Using the one or more trained, supervised multi-class neural networks, the plurality of text variables are classified by the search engine 225 to form corresponding pluralities of initial classifications, step 845. Each plurality of initial classifications from each trained, supervised multi-class neural network, of the plurality of trained, supervised multi-class neural networks, are then differentially weighted by the search engine 225, step 850. The search engine 225 then determines a confidence level or score for each initial classification of the corresponding pluralities of initial classifications, step 855, and combines (e.g., averages) the differentially-weighted pluralities of initial classifications with corresponding confidence levels or scores to form a plurality of resulting classifications, step 860.

The one or more categories or classifications resulting from the plurality of trained, supervised multi-class neural networks may then be filtered and ranked (scored) for accuracy, using the filtering and ranking generator 245, step 865, such as based upon the confidence levels or scores, for example and without limitation. When the filtering and ranking is complete, step 870, the search engine 225 generates and transmits personalized search results to the user (personalized search results transmission 780), with the personalized search results comprising the one or more corresponding categories or classifications corresponding to the one or more primary queries, step 875. The personalized search results and search result rankings are also stored by the search engine 225 in the memory circuit 205 and/or database 220, step 880, and the third method may end, return step 885.

As mentioned above, an exemplary or representative fourth method 900 embodiment for personalization of search results and search result ranking in a search engine is illustrated in FIG. 7, more specifically applied to generating search results which includes business categorizations or classifications. The exemplary or representative fourth method 900 embodiment has considerable overlap with the first, second and third method embodiments previously described, and those having skill in the art will recognize that much of the previous description is equally applicable to the fourth method 900 embodiment. In the interests of brevity, much of the previous description will not be duplicated. As previously described, many of the secondary queries 720, 730, 740, 750 for the fourth method 900 also may be generated and transmitted to an artificial intelligence ("AI") server 790, such as a Generative Pre-trained Transformer 4 (GPT-4) server, a ChatGPT server, or a ChatGPT Plus server, for example and without limitation, with the various controls, safeguards, and parameters previously described. It should also be noted that the steps of the exemplary or representative fourth method 900 embodiment may be performed in a wide variety of orders, and all such variations are considered equivalent and within the scope of the disclosure.

Referring to FIG. 7, and the other Figures, an exemplary or representative fourth method 900 embodiment for personalization of search results and search result ranking in a search engine 225 begins, start step 905, with a reception of one or more primary queries 705 by the search engine 225, step 910. For example and without limitation, in a representative embodiment, a primary query 705 may be a company or personal name, such as the name of a company or person applying for financing, also for example. Using the one or more primary queries 705, the secondary query generator 230 of the search engine 225 generates and transmits one or more first secondary queries 710, with the one or more first secondary queries pertaining to a real time web presence from primary and secondary sources, for example, step 915, and one or more responses to the one or more first secondary queries are received by the search engine 225, step 920 (secondary query response(s) 715). For example and without limitation, in a representative embodiment, the one or more first secondary queries 710 may be transmitted to secondary (or third-party) search engines 785, such as Google or Microsoft Bing, to determine the web presence of the company named in the primary query 705, and may also include secondary queries 710 to perform a web crawl or web scraping, such as a web crawl of the website of the company named in the primary query 705, as described previously. In a representative embodiment, the one or more first secondary queries 710 may also be specific or confined to a selected geographic location, rather than the location of the search engine 225.

As mentioned above, many of the secondary queries 710, 720, 730, 740, 750 stored and indexed in the memory 205 and/or database 220 share a common structure, format or form, and will vary based upon the actual content of the primary query or queries 705 or based upon actual content selected from responses received by the search engine 225 to prior or earlier secondary queries 710, 720, 730, 740, 750. In addition, it is anticipated that the various secondary queries 710, 720, 730, 740, 750, 760 are also likely to be transmitted to different entities or locations and/or utilized to search within any of the various databases 220, 220A, 220B, for example and without limitation, depending upon the individual search to be performed. In this instance, for the first secondary queries 710, the first secondary queries 710 will have a common structure, format or form, and will vary based upon their payload, i.e., based upon the actual content of the primary query or queries 705 received by the search engine 225, and may also vary based upon the destination for transmission, such as to a secondary (or third-party) search engines 785, such as Google or Microsoft Bing, as previously described.

Using responses (715) received to the one or more first secondary queries (710), in step 925, the secondary query generator 230 of the search engine 225 generates and transmits one or more second secondary queries (secondary queries 720) to create an initial, summary description (e.g., an "about us" description), corresponding to the one or more primary queries, and one or more responses (725) to the one or more second secondary queries are received by the search engine 225, step 930 (secondary query response(s) 725), as previously described.

In step 935, the secondary query generator 230 of the search engine 225 generates and transmits one or more third secondary queries (third secondary queries 730) to the AI server 790 to determine a primary activity, such as a primary business activity, such as using the summary description or the one or more primary queries, thereby also corresponding to the one or more primary queries, and one or more responses (735) to the one or more third secondary queries are received by the search engine 225, step 940 (secondary query response(s) 735), also as previously described.

In step 945, the secondary query generator 230 of the search engine 225 generates and transmits one or more fourth secondary queries (fourth secondary queries 740) to the AI server 790 to determine one or more keywords (such as SEO keywords) using the designated primary activity, thereby also corresponding to the one or more primary queries, and one or more responses (745) to the one or more fourth secondary queries are received by the search engine 225, step 950 (secondary query response(s) 745), also as previously described.

In step 955, the secondary query generator 230 of the search engine 225 generates and transmits one or more fifth secondary queries (fifth secondary queries 750) to the AI server 790 to determine an industry description associated with or otherwise using the primary business activity, thereby also corresponding to the one or more primary queries, and one or more responses (755) to the one or more fifth secondary queries are received by the search engine 225, step 960 (secondary query response(s) 755), also as previously described.

When no further or additional secondary queries 710, 720, 730, 740, 750 are necessary or desirable, optionally using predetermined ordering, the search engine 225 extracts, selects, combines (e.g., concatenates as previously described) and/or transforms the secondary query responses (715, 725, 735, 745, 755) into a corresponding plurality of text variables, step 965, as previously described. For example and without limitation, each of the various secondary query responses (715, 725, 735, 745, 755), such as an industry description, one or more keywords (such as SEO keywords), a primary activity, and an initial, summary description (e.g., an "about us" description), may be considered to be text variables populated with corresponding data. Continuing with the example (and also without limitation), the data received in one or more of the secondary query responses (715, 725, 735, 745, 755) may be received as one or more JSON file types, data types or data structures (.json) and extracted and/or transformed in step 965 into a corresponding text variable having another file type, data type, or data structure, such as a text variable having data structured or provided using comma separate values (.csv). Internal commas in the data may also be hidden or replace with escape characters, for example and without limitation. Also as part of the fourth method 900, one or more supervised multi-class neural networks are trained using balanced data, step 970, such as using the balanced training data described above, such as a historical, accurate and labelled dataset typically supplemented by additional or third party data to provide greater coverage or depth, such as greater representation across multiple fields or industries, also for example and without limitation. This training step 970 also may be performed initially, and once the supervised multi-class neural networks are trained to a selected or desired level of accuracy or confidence, the training step 970 may be omitted subsequently.

In a representative embodiment, different types of trained, supervised multi-class neural networks are utilized concurrently, as an ensemble or combination of supervised multi-class neural networks, to provide increased accuracy. For example and without limitation, in a representative embodiment, one or more sequence-based convolutional neural networks may be utilized, in which the ordering of the words in the text variables is significant. Also for example and without limitation, in a representative embodiment, one or more sequence or order-independent multi-class neural networks also may be utilized, in which the ordering of the words in the text variables is not significant and is not utilized by the neural network. Also for example and without limitation, in a representative embodiment, different types of trained, sequence-based convolutional neural network and trained, sequence or order-independent multi-class neural networks may be utilized, including deep learning neural networks or models and linear neural networks or models.

A wide variety of supervised multi-class neural networks may be utilized in the various representative embodiments, for example and without limitation: eXtreme Gradient Boosted Trees Classifier with Early Stopping; Light Gradient Boosted Trees Classifier with Early Stopping (SoftMax Loss) (64 leaves); ExtraTrees Classifier (Gini); Keras Residual Cross Network Classifier using Training Schedule; Keras Text Convolutional Neural Network Classifier; Regularized Logistic Regression Neural Network; Stochastic Gradient Descent Classifier (Elastic Net); Keras Deep Residual Neural Network Classifier using Training Schedule; and/or RandomForest Classifier (Gini); and/or combinations thereof. The supervised multi-class neural networks may be implemented in one or more processor circuits 210 (e.g., as part of the search engine 225) or provided by third parties, for example and without limitation.

In step 975, using the encoding generator (encoder) 255, the plurality of text variables are encoded using byte-pair encoding to form a plurality of ordered, BPE text variables. In step 980, using a trained, sequence-based convolutional neural network, of the plurality of trained, supervised multi-class neural networks, the plurality of ordered, BPE encoded text variables are classified to form a first plurality of initial classifications.

Concurrently or sequentially with steps 975 and 980, using the matrix generator 260, and using the plurality of text variables, a matrix of word-gram occurrences (also referred to as a co-occurrence matrix) is generated, step 985. For example and without limitation, for a text variable of an industry description populated with "computer retail and repair", the various 2-word-grams might include [computer retail], [retail repair], [computer repair], and so on. In a representative embodiment, the rows and columns of the word-gram occurrence matrix represent the words in the text variable, and each cell contains the frequency of co-occurrence (or another selected metric) between the corresponding words in the matrix. In a representative embodiment, each matrix of word-gram occurrences (in step 985) may be based on the relative or comparative importance of each such word (term), such as by using term frequency ("TF") and inverse document frequency ("IDF") (collectively "TF*IDF"), for example and without limitation. For example and without limitation, terms or words having a higher frequency (e.g., in an initial, summary description (e.g., an "about us" description) as a text variable), such as "and" and "the", typically have limited, little or no informative value. Also for example and without limitation, using inverse document frequency (how rare an occurrence of a term is in an entire document or paragraph, for example), such as a ratio of the term frequency in a selected text variable to the document frequency (how many times the term appears in the entire vocabulary of all of the text variables), is also an indicator of the informative value of the selected word or term and may be utilized to provide corresponding cell values (or weightings) in the matrix of word-gram occurrences. In step 990, using one or more trained, sequence or order-independent multi-class neural networks, of the plurality of trained, supervised multi-class neural networks, classifications from the matrix of word-gram occurrences are generated to form corresponding second pluralities of initial classifications.

Each plurality of initial classifications from each trained, supervised multi-class neural network, of the plurality of trained, supervised multi-class neural networks, are then differentially weighted by the search engine 225, as an option, step 995. In a representative embodiment, for example and without limitation, a single trained, sequence-based convolutional neural network is utilized to generate the first plurality of initial classifications and is given a first weighting by the search engine 225, while several trained, sequence or order-independent multi-class neural networks are utilized to generate the second pluralities of initial classifications, which as a group (collectively) are given a second, higher weighting by the search engine 225. Continuing with the example, also without limitation, the first weighting for the first plurality of initial classifications may be 25%, while the second weighting for the second pluralities of initial classifications may be 75%, determined as each of the several trained, sequence or order-independent multi-class neural networks given an individual weighting of 25%, combined to then provide a total weighting of 75% when using three trained, sequence or order-independent multi-class neural networks. Stated another way, each of the initial classifications from the four neural networks of the example above have been given an equal weighting, but because three of the sets of initial classifications are all generated using trained, sequence or order-independent multi-class neural networks, the second pluralities of initial classifications have been effectively given a different, higher weighting collectively compared to the first plurality of initial classifications generated by the trained, sequence-based convolutional neural network. Those having skill in the art will recognize that, depending upon the number and type of trained, sequence-based convolutional neural networks and number and type of trained, sequence or order-independent multi-class neural networks utilized, any type of weighting may be utilized and is within the scope of the disclosure, including differential weighting and equal weighting, for example and without limitation. The search engine 225 then determines a confidence level or score for each initial classification of the corresponding pluralities of initial classifications, step 1000, and combines (e.g., averages) the differentially-weighted (or equally-weighted) pluralities of initial classifications with corresponding confidence levels or scores to form a plurality of resulting classifications, step 1005.

The one or more categories or classifications resulting from the plurality of trained, supervised multi-class neural networks may then be filtered and ranked (scored) for accuracy, using the filtering and ranking generator 245, step 1010, such as based upon the confidence levels or scores, for example and without limitation. When the filtering and ranking is complete, step 1015, the search engine 225 generates and transmits personalized search results to the user (personalized search results transmission 780), with the personalized search results comprising the one or more corresponding categories or classifications corresponding to the one or more primary queries, step 1020. The personalized search results and search result rankings are also stored by the search engine 225 in the memory 205 and/or database 220, step 1025, and the fourth method may end, return step 1030.

Similarly, suitable secondary queries 710, 720, 730, 740, 750, 760 are available for other types of online searching, filtering, matching and ranking, such as searching for real estate, searching for a spouse or companion, or searching for other types of personalized information (e.g., automobile, book, music or clothing recommendations). For example and without limitation, such secondary queries 710, 720, 730, 740, 750, 760 may pertain to expected commute times, access to public transportation, job availability, entertainment availability, and expected quality of the public schools in a geographic region, for real estate searching. Those having skill in the art will recognize that innumerable secondary queries 710, 720, 730, 740, 750, 760 may be developed and deployed for any selected search topic for customized filtering and personalization of search results and search result ranking, and all such secondary queries 710, 720, 730, 740, 750, 760 are within the scope of this disclosure. For other applications of the personalization of search results and search result ranking disclosed herein, suitable secondary queries 710, 720, 730, 740, 750, 760 may be obtained or derived from a wide variety of public and private or subscription sources, such as multiple listing services for real estate, also for example and without limitation.

Those having skill in the art will recognize that any and all such secondary queries 710, 720, 730, 740, 750, 760 are likely to vary over time and be indexed in the memory 205 and/or database 220 for entirely new categories and classifications, new keywords, new industries, etc., as entirely new fields are developed and implemented, and correspondingly secondary queries 710, 720, 730, 740, 750, 760 may be developed and deployed for any selected search topic for personalization of search results, customized filtering, and personalization of search result ranking. Innumerable examples of recently developed new fields are available, and might include smartphone application development, online music download development, social media web development, and so on. In addition, as one aspect of the artificial intelligence of the representative embodiments, the search engine 225 may also suggest additional primary queries 705 and secondary queries 710, 720, 730, 740, 750, 760 to the user, such as primary queries 705 and secondary queries 710, 720, 730, 740, 750, 760 for related categories and classifications. In addition, in many such fields, there may be a substantial overlap of primary queries 705 and secondary queries 710, 720, 730, 740, 750, 760 applicable to these various, different but related fields, such as to the different engineering and constructions industries, for example. In another representative embodiment, such related fields and industries may be cross-indexed or otherwise flagged, such that the secondary query generator 230 may automatically generate and push additional secondary queries to the AI server 790 or secondary (or third-party) search engines 785, also for example.

Those having skill in the art will recognize that the steps indicated in FIGS. 4-7 may be performed in a wide variety of orders, for example. In addition, many of the steps and processes may be performed by the search engine 225 in parallel or multithreaded, particularly in multicore embodiments, such as multiple primary queries 705 and secondary queries 710, 720, 730, 740, 750, 760 assigned to different cores 212 in a multicore processor 210, or performed simultaneously and in parallel across different primary queries 705 and secondary queries 710, 720, 730, 740, 750, 760, with all such variations considered equivalent and within the scope of the present disclosure.

In addition, as another aspect of the artificial intelligence of the representative embodiments, the search engine 225 may also suggest various changes in the primary queries 705 and secondary queries 710, 720, 730, 740, 750, 760 to adjust the various preference parameters, with the search engine 225 (and/or filtering and ranking generator 245) then repeating the scoring, sorting and ranking processes, and generating a new set of personalized and ranked search results. For example, the search engine 225 may run one or more simulations with these modified secondary queries 710, 720, 730, 740, 750, 760 (modified preference parameters, or modified variables), and generate a report back to the user with the new sets of personalized and ranked search results.

It should also be noted that the personalized search results and search result rankings may be provided in a wide variety of ways; for example, the actual goodness of fit or distance scores for a selected primary query 705 may be provided; or the actual goodness of fit or distance scores may be translated to a different scale (e.g., 5 stars, 4.5 stars, 4 stars, etc.) and provided using other scaled indicators or indicia. Also in a representative embodiment, a predetermined number of personalized search results and search result rankings are output in step 465 and/or step 610, rather than all such results and rankings.

It should be noted that the output of the personalized search results and search result rankings is generally provided as a listing or list of sorted and ranked categories or classifications. It should be noted that such a listing or list may have any format of any kind, such as sequential, a chart, a sequence of links, etc., for example and without limitation. Any and all such listing or list formats are considered equivalent and within the scope of the disclosure.

As mentioned above, a wide variety of schema or methods are available to generate actual goodness of fit or distance scores for personalized search results and search result rankings. Those having skill in the art will recognize that there are innumerable ways to calculate such distances and degrees or percentages of goodness of fit, and all such variations are considered equivalent and within the scope of the present disclosure.

In summary, the representative embodiments provide a technical, artificial intelligence solution to an Internet-centric problem of over-inclusiveness and under-inclusiveness of search results and distorted rankings of search results using the prior art keyword searching. The representative embodiments automate the Internet-based searching and selection processes using highly relevant, user-determined characteristics and user-customizable parameters, resulting in personalization of search results and search result ranking. The representative embodiments employ artificial intelligence to "match" information to a user (as a respondent or co-respondent) and provide with greater precision the information the user wants or needs (if available) at the point in time wanted or needed, without inundating the user with thousands of responses or documents which the user cannot possibly review in a reasonable or allocated time.

The representative embodiments automate the Internet-based searching and selection processes using highly relevant, user-determined characteristics and user-customizable parameters, resulting in personalization of search results and search result ranking, including providing relevant, higher-level categorization, classification or other grouping that corresponds to the content of the search query. Such higher-level categorization or classification of a search query can be useful in a wide-variety of fields, including for providing medical or surgical diagnoses, medical or surgical diagnostic categories and codes, human resource benefits administration, toxicity determinations for new pharmaceuticals, underwriting and other financial decisions (such as bank loan approval or disapproval), fraud detection, for example and without limitation. The representative embodiments further automate the Internet-based searching and selection processes using highly relevant, user-determined and centrally-located filters, also resulting in personalization of search results and search result ranking.

As a result, the representative embodiments improve the functioning of Internet-based searches, providing highly personalized search results and search result rankings, thereby dramatically decreasing the amount of search time required for a user to discover relevant and actionable information.

It should be noted that the representative embodiments provide a technical solution to a technical, Internet-centric problem of over-inclusiveness of search results and distorted rankings of search results using the prior art keyword searching. Similarly, the representative embodiments are also necessarily technical and improve the functioning of the Internet and networked computing devices as a whole, providing an artificial intelligence solution to this Internet-centric problem by enabling personalization of search results and search result ranking.

Lastly, it should also be noted that the representative embodiments cannot merely be performed by hand or in the human mind. As mentioned above, using conservative estimates, it would not be unusual for there to be massive numbers of primary queries 705. To search and obtain categories or classifications for potentially hundreds of thousands or millions of queries would take years and years, an insurmountable task for time-sensitive information and requirements. Assuming a highly capable person could perform each categorization in ten minutes, would then take 10 million minutes to process a mere million queries, translating to over 166 thousand hours, and for an eight hour work day per person, consume 20,833 person-days, or stated more simply, would take 57 person-years, which are clearly not available when trying to respond to a query within seconds!

As used herein, a processor circuit 210, 305 (and, for the processor circuit 210, its incorporated search engine 225, secondary query generator 230, vector generator 235, category (classification) generator 240, filtering and ranking generator 245, encoding generator 255, matrix generator 260, and any of the various supervised multi-class neural networks) may be implemented using any type of digital or analog electronic or other circuitry which is arranged, configured, designed, programmed or otherwise adapted to perform any portion of the personalization of search results and search result rankings functionality, described herein. As the term processor or processor circuit is used herein, a processor 210, 305 may include use of a single integrated circuit ("IC"), or may include use of a plurality of integrated circuits or other electronic components connected, arranged or grouped together, such as processors, controllers, microprocessors, digital signal processors ("DSPs"), parallel processors, multiple core processors, custom ICs, application specific integrated circuits ("ASICs"), field programmable gate arrays ("FPGAs"), adaptive computing ICs, discrete electronic components, and any associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits or discrete electronic components which perform the functions discussed above and further discussed below, and may further include any associated memory, such as microprocessor memory or additional RAM, DRAM, SDRAM, SRAM, MRAM, ROM, FLASH, EPROM or $E^2$PROM. A processor (such as processor 210, 305), with any associated memory, may be arranged, adapted or configured (via programming, FPGA interconnection, or hard-wiring) to perform any portion of the personalization of search results and search result rankings of the present disclosure, as described herein. For example, the methodologies may be programmed and stored, in a processor 210, 305 with its associated memory (and/or memory circuits 205, 310, respectively) and other equivalent components, as a set of program instructions or other code (or equivalent configuration or other program) for subsequent execution when the processor 210, 305 is operative (i.e., powered on and functioning). Equivalently, when the processor 210, 305 may implemented in whole or part as FPGAs, custom ICs and/or ASICs, the FPGAs, custom ICs or ASICs also may be designed, configured and/or hard-wired to implement any portion of the personalization of search results and search result rankings of the present disclosure. For example, the processor 210, 305 may be implemented as an arrangement of analog and/or digital circuits, controllers, microprocessors, DSPs and/or ASICs, collectively referred to as a "processor", which are respectively hard-wired, arranged, programmed, designed, adapted or configured to implement personalization of search results and search result rankings of the present disclosure, including possibly in conjunction with a memory 205, 310.

The operations described in this disclosure can be implemented as operations performed by a data processing apparatus on data stored on one or more machine-readable storage devices or on data received from other sources. Server system 200 is an example of a representative data processing apparatus. As utilized herein, the terminology "data processing apparatus" encompasses any and all kinds of apparatus, devices, and machines for processing data, including by way of example a programmable processor (210, 305), a computer, a server, a system on a chip ("SOC"), or combinations of such devices. The server system 200 can also include code (such as executable code) that creates an execution environment for a data processing apparatus, or other program, such as processor 210 firmware, a protocol stack, a database (220, 220A) management system, an operating system, a cross-platform runtime environment, a virtual machine, and/or combinations thereof, which may be utilized in a computer, a server 200, or other data processing apparatus.

A memory 205, 310 and/or a data storage device 250 may be embodied as any type of data storage device, such as RAM, FLASH, DRAM, SDRAM, SRAM, MRAM, FeRAM, ROM, EPROM or $E^2$PROM, and is utilized for data storage, and also may be utilized to store any program instructions or configurations which may be utilized by a processor 210, 305. More specifically, the memory 205, 310 and/or a data storage device 250 may be embodied in any number of forms, including within any nontransitory, machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 210, 305 or processor IC), whether volatile or non-volatile, whether removable or non-removable, including without limitation RAM, FLASH, DRAM, SDRAM, SRAM, MRAM, FeRAM, ROM, EPROM or E²PROM, or any other form of memory or data storage device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 205, 310 and/or a data storage device 250 may store data in any way or configuration, including as various look up tables, parameters, coefficients, databases, other information and data, programs or instructions (of the software of the present invention), and other types of tables such as database tables or any other form of data repository.

The network interface (I/O) circuits 215, 315 may be implemented as known or may become known in the art, and may include impedance matching capability, voltage rectification circuitry, voltage translation for a low voltage processor to interface with a higher voltage control bus for example, various switching mechanisms (e.g., transistors) to turn various lines or connectors on or off in response to signaling from a processor 210, 305, other control logic circuitry, and/or physical coupling mechanisms. In addition, the network interface (I/O) circuits 215, 315 are also adapted to receive and/or transmit signals externally to the server system 200 and client device 300, 300A, respectively, such as through hard-wiring or RF signaling, for example, to receive and transmit information in real-time, such as queries 705, 710, return queries 715, 720, and personalized search results and search result rankings, also for example. The network interface (I/O) circuits 215, 315 also may be stand-alone devices (e.g., modular). The network interface (I/O) circuits 215, 315 are utilized for appropriate connection to a relevant channel, network or bus; for example, the network interface (I/O) circuits 215, 315 may provide impedance matching, drivers and other functions for a wireline interface, may provide demodulation and analog to digital conversion for a wireless interface, and may provide a physical interface for the memory 205, 310 with other devices. In general, the network interface (I/O) circuits 215, 315 are used to receive and transmit data, depending upon the selected embodiment, such as queries 705, 710, return queries 715, 720, and personalized search results and search result rankings, control messages, authentication data, profile information, and other pertinent information.

As indicated above, the processor 210, 305 is hard-wired, configured or programmed, using software and data structures of the invention, for example, to perform any portion of the automated personalization of search results and search result rankings, of the present disclosure. As a consequence, the system and methods of the present disclosure may be embodied as software which provides such programming or other instructions, such as a set of instructions and/or metadata embodied within a nontransitory computer-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Javascript, Adobe Flash, Silverlight, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, "software", "program", "computer program", or a "module", "program module", "software module", as used equivalently herein, means and refers to any programming language, of any kind, with any syntax or signatures, which provides or can be interpreted to provide the associated functionality or methodologies specified (when instantiated or loaded into a processor or computer and executed, including the processor 210, 305, for example). In addition, any of such program or software modules may be combined or divided in any way. For example, a larger module combining first and second functions is considered equivalent to a first module which performs the first function and a separate second module which performs the second function.

For example, a computer program (e.g., a program, software, software application, script, or code) can be written in any form of programming language, including compiled, interpreted, declarative, or procedural languages. Such a program may be implemented in any form, including as a stand-alone program or as a module, component, subroutine, object, or other construct which may be used in a computing environment, and may be stored as a file, a file system, multiple files, or portion of a file which includes other programs or data, such as a script stored in a markup language document, and may be executed on one or more computers, servers 200, or other data processing apparatus that are co-located or distributed across multiple locations and interconnected by a network such as network or internet 110.

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 205, 310, e.g., a memory IC, a floppy disk, a CDROM, a CD-RW, a DVD, a magnetic hard drive, an optical drive, or any other type of data storage apparatus or medium, as mentioned above.

In addition to the server system 200 illustrated in FIG. 2, those having skill in the art will recognize that there are innumerable equivalent configurations, layouts, kinds and types of server and control circuitry known in the art, which are within the scope of the present invention.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. No inventions are disclaimed.

The invention claimed is:

1. A computer server system coupleable to a network for Internet search and personalization of search results and search result rankings, the computer server system comprising:

a network input and output interface configured to transmit and receive data via the network, the network input and output interface further configured to receive a primary query from a user; to transmit a plurality of secondary queries, at least one first secondary query of the plurality of secondary queries having a first destination address to a secondary search engine, and a second secondary query and a third secondary query of the plurality of secondary queries each having a second destination address to an artificial intelligence server; to receive a plurality of responses to the plurality of secondary queries; and to transmit personalized search results and search result rankings to the user;

at least one data storage device configured to store the structure or format of the plurality of secondary queries; and one or more processors configured as a primary search engine and coupled to the at least one data storage device and to the network input and output interface, the one or more processors further configured to access the at least one data storage device;

the one or more processors further configured to generate for transmission, using the primary query, the at least one first secondary query; to generate for transmission, using a first response to the first secondary query, of the plurality of responses to the plurality of secondary queries, the second secondary query; to generate for transmission, using a second response to the second secondary query, of the plurality of responses to the plurality of secondary queries, the third secondary query; to extract or transform one or more responses to the second and third secondary queries, of the plurality of responses to the plurality of secondary queries, into a plurality of text variables; the one or more processors further configured to perform a data reduction by encoding the plurality of text variables using byte-pair encoding to form a plurality of ordered, byte-pair encoded ("BPE") text variables; to generate a matrix of word-gram occurrences using the plurality of text variables; to use a trained, sequence-based convolutional neural network, of a plurality of trained, supervised multi-class neural networks, to classify the plurality of ordered, BPE text variables to form a first plurality of initial classifications; concurrently or in parallel with using the trained, sequence-based convolutional neural network to form the first plurality of initial classifications, to generate a plurality of classifications from the matrix of word-gram occurrences using a plurality of different, trained, sequence or order-independent multi-class neural networks, of the plurality of trained, supervised multi-class neural networks, to form corresponding second pluralities of initial classifications; to differentially weight each plurality of initial classifications from each trained, supervised multi-class neural network of the plurality of trained, supervised multi-class neural networks; to determine a confidence level or score for each initial classification of the pluralities of initial classifications; to combine the pluralities of initial classifications or categories with corresponding confidence levels or scores to form a plurality of resulting classifications or categories; to filter and rank the plurality of resulting classifications or categories; and the one or more processors further configured to use the filtered and ranked plurality of resulting classifications or categories to generate and output the personalized search results and search result rankings, the personalized search results and search result rankings comprising one or more associated classifications or categories corresponding to the primary query.

2. The computer server system of claim 1, wherein the one or more processors are further configured to generate the at least one first secondary query having a corresponding first data payload, the first data payload comprising at least a portion of the primary query.

3. The computer server system of claim 2, wherein the one or more processors are further configured to generate the second secondary query from the first response to the first secondary query, the second secondary query comprising a collection of one or more descriptions, descriptive words, and keywords obtained from an Internet search of the at least a portion of the primary query using the secondary internet search engine.

4. The computer server system of claim 2, wherein the one or more processors are further configured to generate the second secondary query as a prompt or directive to the artificial intelligence server to generate a summary description from the first response to the first secondary query.

5. The computer server system of claim 4, wherein the artificial intelligence server is selected from the group consisting of: a Generative Pre-trained Transformer 4 (GPT-4) server, a ChatGPT server, a ChatGPT Plus server, Amazon Web Services (AWS) Titan, Anthropic Claude, AI21 Labs Jurassic, Meta AI's Llama, and combinations thereof.

6. The computer server system of claim 4, wherein the one or more processors are further configured to generate the third secondary query comprising a prompt or directive to the artificial intelligence server to determine a description of an associated primary activity from the summary description.

7. The computer server system of claim 6, wherein the one or more processors are further configured to generate a fourth secondary query comprising a prompt or directive to the artificial intelligence server to determine one or more keywords from the description of the associated primary activity.

8. The computer server system of claim 6, wherein the one or more processors are further configured to generate a fifth secondary query comprising a prompt or directive to the artificial intelligence server to determine an industry description from the description of the associated primary activity.

9. The computer server system of claim 1, wherein the one or more processors are further configured to generate the matrix of word-gram occurrences using term frequency ("TF") and inverse document frequency ("IDF") ("TF*IDF").

10. The computer server system of claim 1, wherein the one or more processors are further configured to combine the pluralities of initial classifications with corresponding confidence levels or scores by averaging the differentially-weighted pluralities of initial classifications with the corresponding confidence levels or scores to form the plurality of resulting classifications.

11. A computer server-implemented method for Internet search and personalization of search results and search result rankings, the computer server-implemented method comprising:
using a network input and output interface of the computer server, receiving a primary query from a user;
using one or more processors of the computer server configured as a primary search engine, and using the primary query, generating at least one first secondary query of a plurality of secondary queries;
using the network input and output interface, transmitting the at least one first secondary query having a first destination address to a secondary search engine;
using the network input and output interface, receiving a first response to the at least one first secondary query of a plurality of responses to the plurality of secondary queries;
using the one or more processors, and using the first response to the at least one first secondary query, generating a second secondary query of the plurality of secondary queries;
using the network input and output interface, transmitting the second secondary query having a second destination address to an artificial intelligence server;
using the one or more processors, and using a second response to the second secondary query of the plurality of responses to the plurality of secondary queries, generating a third secondary query of the plurality of secondary queries;
using the network input and output interface, transmitting the third secondary query having the second destination address to the artificial intelligence server,
using the network input and output interface, receiving one or more responses to the second and third secondary queries, of the plurality of responses to the plurality of secondary queries;
using the one or more processors, extracting or transforming the one or more responses to the second and third secondary queries, of the plurality of responses to the plurality of secondary queries, into a plurality of text variables;
using the one or more processors, performing a data reduction by encoding the plurality of text variables using byte-pair encoding to form a plurality of ordered, byte-pair encoded ("BPE") text variables;

using the one or more processors, generating a matrix of word-gram occurrences using the plurality of text variables;

using the one or more processors, and using a trained, sequence-based convolutional neural network, of a plurality of trained, supervised multi-class neural networks, classifying the plurality of ordered, BPE text variables to form a first plurality of initial classifications;

using the one or more processors, concurrently or in parallel with using the trained, sequence-based convolutional neural network to form the first plurality of initial classifications, generating a plurality of classifications from the matrix of word-gram occurrences using a plurality of different, trained, sequence or order-independent multi-class neural networks, of the plurality of trained, supervised multi-class neural networks, to form corresponding second pluralities of initial classifications;

using the one or more processors, differentially weighting each plurality of initial classifications from each trained, supervised multi-class neural network of the plurality of trained, supervised multi-class neural networks;

using the one or more processors, determining a confidence level or score for each initial classification of the pluralities of initial classifications;

using the one or more processors, combining the pluralities of initial classifications with corresponding confidence levels or scores to form a plurality of resulting classifications or categories;

using the one or more processors, filtering and ranking the plurality of resulting classifications or categories;

using the one or more processors, and using the filtered and ranked plurality of resulting classifications or categories, generating the personalized search results and search result rankings, the personalized search results and search result rankings comprising one or more associated classifications or categories corresponding to the primary query; and using the network input and output interface, transmitting the personalized search results and search result rankings to the user.

12. The computer server-implemented method of claim 11, wherein the step of generating the at least one first secondary query further comprises:

using the one or more processors, generating the at least one first secondary query having a corresponding first data payload, the first data payload comprising at least a portion of the primary query.

13. The computer server-implemented method of claim 12, wherein the step of generating the second secondary query further comprises:

using the one or more processors, generating the second secondary query from the first response to the at least one first secondary query, the second secondary query comprising a collection of one or more descriptions, descriptive words, and keywords obtained from an Internet search of the at least a portion of the primary query using the secondary internet search engine.

14. The computer server-implemented method of claim 13, wherein the step of generating the second secondary query further comprises:

using the one or more processors, generating the second secondary query as a prompt or directive to the artificial intelligence server to generate a summary description from the first response to the first secondary query.

15. The computer server-implemented method of claim 14, wherein the artificial intelligence server is selected from the group consisting of: a Generative Pre-trained Transformer 4 (GPT-4) server, a ChatGPT server, a ChatGPT Plus server, Amazon Web Services (AWS) Titan, Anthropic Claude, AI21 Labs Jurassic, Meta AI's Llama, and combinations thereof.

16. The computer server-implemented method of claim 12, wherein the step of generating the third secondary query further comprises:

using the one or more processors, generating the third secondary query comprising a prompt or directive to the artificial intelligence server to determine a description of an associated primary activity.

17. The computer server-implemented method of claim 16, further comprising:

using the one or more processors, generating a fourth secondary query comprising a prompt or directive to the artificial intelligence server to determine one or more keywords from the description of the associated primary activity.

18. The computer server-implemented method of claim 17, further comprising:

using the one or more processors, generating a fifth secondary query comprising a prompt or directive to the artificial intelligence server to determine an industry description from the description of the associated primary activity.

19. The computer server-implemented method of claim 11, wherein the step of generating the matrix of word-gram occurrences using the plurality of text variables further comprises using term frequency ("TF") and inverse document frequency ("IDF") ("TF*IDF").

20. The computer server-implemented method of claim 11, further comprising:

using the one or more processors, combining the pluralities of initial classifications with corresponding confidence levels or scores by averaging the differentially-weighted pluralities of initial classifications with the corresponding confidence levels or scores to form the plurality of resulting classifications.

21. A computer server system coupleable to a network for Internet search and personalization of search results and search result rankings, the computer server system comprising:

a network input and output interface configured to transmit and receive data via the network, the network input and output interface further configured to receive a primary query from a user; to transmit a plurality of secondary queries, at least one first secondary query of the plurality of secondary queries having a data payload comprising at least a portion of the primary query and having a first destination address to a secondary search engine, and a second secondary query and a third secondary query of the plurality of secondary queries each having a second destination address to an artificial intelligence server; to receive a plurality of responses to the plurality of secondary queries; and to transmit personalized search results and search result rankings to the user;

at least one data storage device configured to store the structure or format of the plurality of secondary queries; and one or more processors configured as a primary search engine and coupled to the at least one data storage device and to the network input and output interface, the one or more processors further configured to access the at least one data storage device; the one or more processors further configured to generate for transmission, using the primary query, the at least one first secondary query; to generate for transmission, using a first response to the first secondary query, of the plurality of responses to the plurality of secondary queries, the second secondary query; to generate for transmission, using a second response to the second secondary query, of the plurality of responses to the plurality of secondary queries, the third secondary query; to extract or transform one or more responses to the second and third secondary queries, of the plurality of responses to the plurality of secondary queries, into a plurality of text variables; the one or more processors further configured to perform a data reduction by encoding the plurality of text variables using byte-pair encoding to form a plurality of ordered, byte-pair encoded ("BPE") text variables; to generate a matrix of word-gram occurrences using the plurality of text variables; to use a trained, sequence-based convolutional neural network, of a plurality of trained, supervised multi-class neural networks, to classify the plurality of ordered, BPE text variables to form a first plurality of initial classifications; concurrently or in parallel with using the trained, sequence-based convolutional neural network to form the first plurality of initial classifications, to generate a plurality of classifications from the matrix of word-gram occurrences using a plurality of different, trained, sequence or order-independent multi-class neural networks, of the plurality of trained, supervised multi-class neural networks, to form corresponding second pluralities of initial classifications; to differentially weight each plurality of initial classifications from each trained, supervised multi-class neural network of the plurality of trained, supervised multi-class neural networks; to determine a confidence level or score for each initial classification of the pluralities of initial classifications; the one or more processors further configured to combine the pluralities of initial classifications or categories with corresponding confidence levels or scores by averaging the differentially-weighted pluralities of initial classifications with the corresponding confidence levels or scores to form a plurality of resulting classifications or categories; to filter and rank the plurality of resulting classifications or categories; and the one or more processors further configured to use the filtered and ranked plurality of resulting classifications or categories to generate and output the personalized search results and search result rankings, the personalized search results and search result rankings comprising one or more associated classifications or categories corresponding to the primary query.

22. The computer server system of claim 1, wherein the one or more processors are further configured to train the plurality of trained, supervised multi-class neural networks using balanced data combining historical data with a labelled dataset.

23. The computer server-implemented method of claim 11, further comprising:
  using the one or more processors, training the plurality of trained, supervised multi-class neural networks using balanced data combining historical data with a labelled dataset.

\* \* \* \* \*